US009171710B2

(12) United States Patent
Liang et al.

(10) Patent No.: US 9,171,710 B2
(45) Date of Patent: Oct. 27, 2015

(54) MASS SPECTROMETRIC ANALYSIS USING NANOPARTICLE MATRICES

(71) Applicant: The Board of Trustees of The University of Alabama, Tuscaloosa, AL (US)

(72) Inventors: Qiaoli Liang, Tuscaloosa, AL (US); Yuping Bao, Tuscaloosa, AL (US); Carolyn J. Cassady, Tuscaloosa, AL (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 0 days.

(21) Appl. No.: 14/487,806

(22) Filed: Sep. 16, 2014

(65) Prior Publication Data

US 2015/0076340 A1 Mar. 19, 2015

Related U.S. Application Data

(60) Provisional application No. 61/878,140, filed on Sep. 16, 2013.

(51) Int. Cl.
*H01J 49/16* (2006.01)
*H01J 49/00* (2006.01)
*H01J 49/26* (2006.01)
*B01D 59/44* (2006.01)

(52) U.S. Cl.
CPC ........... *H01J 49/164* (2013.01); *H01J 49/0031* (2013.01); *H01J 49/26* (2013.01)

(58) Field of Classification Search
CPC .... B82Y 30/00; B82Y 15/00; G01N 2500/04; G01N 33/54346; H01J 49/0418; H01J 49/164; H01J 49/26
USPC ........... 250/282, 281, 288, 423 R, 424, 423 P
See application file for complete search history.

(56) References Cited

U.S. PATENT DOCUMENTS

| | | | | |
|---|---|---|---|---|
| 7,122,792 | B2 | 10/2006 | Chen et al. | |
| 7,202,472 | B2 | 4/2007 | Schmucker et al. | |
| 8,354,234 | B2 | 1/2013 | Chen et al. | |
| 2008/0044830 | A1 * | 2/2008 | Tovar et al. | 435/6 |
| 2008/0261321 | A1 * | 10/2008 | Patton et al. | 436/104 |
| 2012/0104243 | A1 | 5/2012 | Verbeck, IV et al. | |
| 2012/0261567 | A1 | 10/2012 | Voorhees et al. | |
| 2014/0179941 | A1 * | 6/2014 | Bao | 554/74 |

FOREIGN PATENT DOCUMENTS

| | | |
|---|---|---|
| EP | 2416345 | 2/2012 |
| WO | 2012/050810 | 4/2012 |

* cited by examiner

*Primary Examiner* — Nikita Wells
(74) *Attorney, Agent, or Firm* — Meunier Carlin & Curfman LLC

(57) ABSTRACT

Methods of characterizing an analyte of interest are provided. The methods can involve using a population of nanoparticles (e.g., magnetic ferrite nanoparticles) as a matrix for matrix-assisted laser desorption ionization (MALDI) mass spectrometry. The size, shape, and composition of the nanoparticles can be selected in view of a variety of factors, including the nature of the analyte of interest, the desired characteristics of the mass spectrum, the nature of the energy directed onto the target composition, and combinations thereof. The nanoparticle matrix can enhance MALDI analysis by providing a cleaner mass spectral background and/or inducing abundant fragmentation of analyte ions by in-source decay (ISD). The nanoparticles are also versatile and selective; the nanoparticle matrix can be tuned to render the matrix particles compatible with an analyte of interest and/or improve selectivity for an analyte of interest.

29 Claims, 14 Drawing Sheets

MASS SPECTROMETRIC ANALYSIS USING NANOPARTICLE MATRICES

CROSS REFERENCE TO RELATED APPLICATIONS

This application claims the benefit of priority to U.S. Provisional Application No. 61/878,140, filed Sep. 16, 2013, which is incorporated by reference herein in its entirety.

TECHNICAL FIELD

This application relates generally to the use of metal oxide nanoparticles, particularly ferrite nanoparticles, as a matrix for Matrix-Assisted Laser Desorption Ionization (MALDI) mass spectrometry.

BACKGROUND

Matrix-Assisted Laser Desorption Ionization (MALDI) is a widely used ionization technique for the analysis of a diverse range of analytes, including biomolecules and polymers, by mass spectrometry (MS). In particular, MALDI is well suited for the analysis of high molecular weight analytes. As a consequence, MALDI is widely used in a number of biochemical and biomedical applications (e.g., for the analysis of biomolecules such as proteins) and quality control in polymer production. In MALDI, a sample to be analyzed is mixed with an excess of matrix compound to form a target. A laser is then fired at the target. The matrix compound in the target absorbs the incident energy from the laser, and transfers the energy to the analyte, causing desorption and ionization of analyte. Analyte ions enter the mass spectrometer, where molecular mass and structural information are obtained. The nature of the matrix used for a MALDI experiment greatly impacts the nature and quality of the resulting mass spectrum. Accordingly, the development of improved matrix materials can provide improved MALDI mass spectrometric methods. The compositions and methods disclosed herein address these needs and also provide a platform technology whereby new MALDI matrixes are created and customized for particular classes of analytes.

SUMMARY

The subject matter disclosed herein relates to compositions and methods of making and using the compositions. In particular, disclosed are nanoparticles that can be used in MALDI mass spectrometry. Also disclosed are methods of detecting an analyte of interest. The methods can involve using a population of nanoparticles as a matrix for MALDI mass spectrometry. Methods of detecting an analyte of interest can involve contacting the analyte with a population of nanoparticles to form a target composition, directing energy onto the target composition to form an analyte ion; and detecting the analyte ion with a mass spectrometer.

Also provided are methods of ionizing an analyte of interest. Methods of ionizing an analyte of interest can involve contacting the analyte with a population of nanoparticles to form a target composition, and pulsing a laser to direct energy onto the target composition. The energy can desorb and ionize the analyte, forming an analyte ion. Once ionized, the analyte of interest can be detected using methods known in the art, such as mass spectrometry. Accordingly, also provided are methods of detecting an analyte, which can comprise ionizing the analyte according to the method described above, and detecting the analyte ion (e.g., using a mass spectrometer).

The disclosed nanoparticles used as a matrix for MALDI mass spectrometry comprise an oxide core and a plurality of ligands coordinated to the metal oxide core. The size, shape, and composition of the nanoparticles (e.g., chemical makeup of the metal oxide core, identity of the ligands coordinated to the metal oxide core, and combinations thereof) can be selected in view of a variety of factors, including the nature of the analyte of interest (e.g., analyte polarity), the desired characteristics of the mass spectrum (e.g., desired degree of fragmentation), the nature of the energy directed onto the target composition, and combinations thereof.

In some examples, the smallest dimension of the nanoparticles can range from about 1 nm to about 150 nm (e.g., from about 1 nm to about 125 nm, from about 1 nm to about 100 nm, from about 1 nm to about 75 nm, from about 1 nm to about 50 nm, from about 1 nm to about 30 nm, or from about 1 nm to about 10 nm). In certain cases, the nanoparticles comprise ultrathin nanostructures having a smallest dimension ranging from about 1 nm to about 4 nm (e.g., from about 1 nm to about 2 nm). The nanoparticles can have a variety of shapes. For example, the nanoparticles can comprise nanocubes, nanobars, nanoplates, nanoflowers, nanowhiskers, nanotubes, nanospheres, or combinations thereof.

The metal oxide core of the nanoparticles can comprise, for example, $Fe^{2+}$, $Fe^{3+}$, a ferric oxide, ferrous oxide, a non-ferrous metal ferrite, or combinations thereof. The non-ferrous metal ferrite can comprise, by way of example, a zinc ferrite, a calcium ferrite, a magnesium ferrite, a manganese ferrite, a copper ferrite, a chromium ferrite, a cobalt ferrite, a nickel ferrite, a sodium ferrite, a potassium ferrite, a barium ferrite, or combinations thereof.

One or more ligands can be attached to the metal oxide core, for example, by coordination bonds. The ligands can be hydrophobic or hydrophilic. The identity of the ligands can be selected in view of a number of factors, including the polarity of the analyte of interest. The plurality of ligands can comprise, for example, an alcohol, a carboxylic acid, a phosphine, a phosphine oxide, an amine, a thiol, a siloxane, or combinations thereof.

The population of nanoparticles can also comprise an additive. The particular additive can be selected in view of the particular analyte being analyzed. The additive can comprise, for example, inorganic ions, $K^+$, $Li^+$, $NH_4^+$, etc, and small organic acids, citric acid, and so on.

The nanoparticles described herein offer significant potential as matrices for MALDI mass spectrometry. The nanoparticle matrix can intensely absorb UV/visible light, providing for energy transfer from laser photons to the analyte of interest. In addition, the characteristics of the nanoparticle matrix (e.g., chemical makeup of the oxide core, identity of the ligands coordinated to the oxide core, and combinations thereof) can be varied to provide a matrix suitable for a given analyte and/or analytical methods.

The nanoparticle matrix offers advantages compared to traditional small molecule organic matrices for MALDI. First, nanoparticle matrices can provide a cleaner mass spectral background as compared to small molecule organic matrices. In some examples, the mass spectra obtained using the disclosed nanoparticles do not contain background peaks that can obscure, for example, the molecular ion peaks of a low molecular weight analyte. The shell of ligands coordinated to the nanoparticles can also reduce matrix molecule self-clustering and fragmentation (a common problem with organic matrices), which can, in turn, minimize the intensity of low mass background ions that can complicate the mass spectra. The shell of ligands coordinated to the nanoparticles can also be readily varied based on the analyte of interest. For example, the polarity of the nanoparticles can be tuned to render the matrix particles compatible with the analyte of interest (e.g., compatible with a hydrophobic or hydrophilic polymer). The ligands coordinated to the nanoparticles can also be varied to selectively interact with a desired analyte of interest within a complex mixture. The nanoparticles also allow for facile energy transfer to the analyte of interest. Due to their ability to absorb and transfer energy from a suitable laser, nanoparticles can induce abundant fragmentation of analyte ions by in-source decay (ISD). In this way, the disclosed nanoparticles can be used to provide improved structural information regarding an analyte of interest, as compared to small molecule organic matrices.

The methods described herein can be applied to various fields of mass analysis, including the analysis of glycans and glycoconjugates (e.g., glycoproteins, glycolipids, and proteoglycans), proteins, lipids, small molecules (e.g., pharmaceuticals), oligomers, and polymers. For example, the methods described herein can be used to detect, sequence, and/or image proteins, glycans, glycoconjugates, polynucleotides, and oligonucleotides; to detect and/or image drugs, biomarkers, and metabolites; and to characterize polymers, including synthetic polymers such as fluoropolymers. The methods described herein can be used, for example, to characterize organometallic compounds, or those that comprise an organic part incorporated with one or more metal elements, or elements with metallic character, such as boron, silicon, and tellurium. The methods described herein can be used, for example, in healthcare applications (e.g., in basic research, in clinical diagnosis, and in patient monitoring), in pharmaceutical sciences, in food sciences (e.g., in quality control efforts), and in the polymer industry (e.g., in quality control applications). The disclosed nanoparticle matrix can also be used for the MALDI imaging (e.g., to analyze proteins, lipids, drug molecules, metabolites, and biomarkers within a tissue sample). The disclosed nanoparticles can provide a high lateral resolution and clean spectral background when used as a matrix material for MALDI imaging.

Additional advantages of the disclosed subject matter will be set forth in part in the description that follows, and in part will be obvious from the description, or can be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying Figures, which are incorporated in and constitute a part of this specification, illustrate several aspects of the invention and together with the description serve to explain the principles of the invention.

As shown in FIG. 6, the ISD fragmentation is enhanced by using PAA-capped nanoparticles as co-matrix. DAN matrix was prepared as a saturated solution in 20% ACN with 0.1% $NH_4OH$, a PAA-capped nanoparticle matrix was prepared as 1 mg/mL solution in water with 0.1% $NH_4OH$. The upper trace shows the MALDI/TOF ISD mass spectrum of DAN mixed with ubiquitin (1 mg/mL) at 2:1 (v/v); the lower trace shows the MALDI/TOF ISD mass spectrum of DAN mixed with PAA-capped nanoparticles and ubiquitin at 2:1:1 (v/v/v).

DETAILED DESCRIPTION

Figure 1:
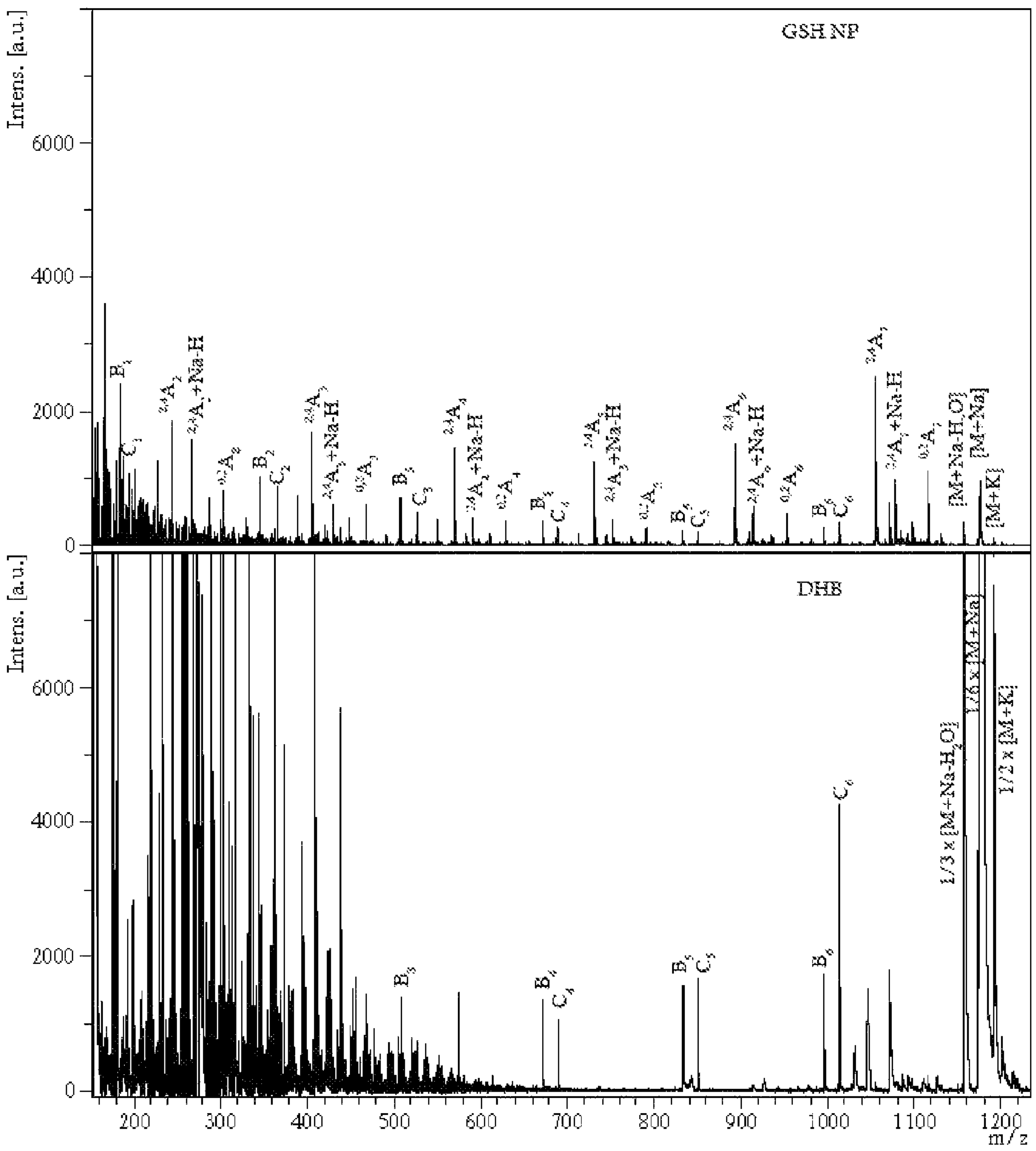
FIG. 1 contains MALDI/TOF ISD mass spectra of maltoheptose acquired using a glutathione (GSH)-capped nanoparticle matrix (top) and 2,5-dihydroxybenzoic acid (DHB) matrix (bottom). The top spectrum demonstrates that the GSH-capped nanoparticle matrix induces abundant cross ring ($^{0,2}A_n$, $^{2,4}A_n$) and glycosidic cleavages ($B_n$, $C_n$), and provides a cleaner matrix background in the low mass region. The DHB matrix (bottom) exclusively induces glycosidic cleavages; the massive peaks below m/z 500 are mostly due to matrix impurities and clustering.

The compositions and methods described herein can be understood more readily by reference to the following detailed description of specific aspects of the disclosed subject matter and the Examples and Figures included therein.

Before the present compositions and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

GENERAL DEFINITIONS

In this specification and in the claims that follow, reference will be made to a number of terms, which shall be defined to have the following meanings:

As used in the description and the appended claims, the singular forms "a," "an," and "the" include plural referents unless the context clearly dictates otherwise. Thus, for example, reference to "a composition" includes mixtures of two or more such compositions; reference to "the compound" includes mixtures of two or more such compounds, and the like.

"Optional" or "optionally" means that the subsequently described event or circumstance can or cannot occur, and that the description includes instances where the event or circumstance occurs and instances where it does not.

"Monodisperse" and "homogeneous size distribution," as used herein, and generally describe a population of nanoparticles where all of the nanoparticles are the same or nearly the same size. As used herein, a monodisperse distribution refers to particle distributions in which 80% of the distribution (e.g., 85% of the distribution, 90% of the distribution, or 95% of the distribution) lies within 25% of the median particle size (e.g., within 20% of the median particle size, within 15% of the median particle size, within 10% of the median particle size, or within 5% of the median particle size).

"Mean particle size" or "average particle size" are used interchangeably herein, and generally refer to the statistical mean particle size of the nanoparticles in a population of nanoparticles. The diameter of a nanoparticle can refer preferentially to the hydrodynamic diameter. As used herein, the hydrodynamic diameter of a nanoparticle can refer to the largest linear distance between two points on the surface of the nanoparticle. Mean particle size can be measured using methods known in the art, such as evaluation by scanning electron microscopy.

"Ferrite," as used herein, refers to a mixed oxide with a general structure $AB_2O_4$ (where A and B are two different metal ions) such as, but not limited to, magnetite ($Fe_3O_4$), maghemite ($Fe_2O_3$), zinc ferrite, calcium ferrite, magnesium ferrite, manganese ferrite, copper ferrite, chromium ferrite, cobalt ferrite, nickel ferrite, sodium ferrite, potassium ferrite, and barium ferrite.

"Catechol," as used herein, refers to 1,2-dihydroxybenzene moiety.

"Catecholamine," as used herein, refers to an organic compound comprising a catechol moiety and a side-chain comprising an amine group. Examples of catecholamines include dopamine, L-DOPA (L-3,4-dihydroxyphenylalanine), and norepinephrine.

"Small Molecule," as used herein, refers to a molecule, such as an organic or organometallic compound, with a molecular weight of less than about 2,000 Daltons (e.g., less than about 1,500 Daltons, less than about 1,200 Daltons, less than about 1,000 Daltons, or less than about 800 Daltons). The small molecule can be a hydrophilic, hydrophobic, or amphiphilic compound.

Methods and Materials

Provided herein are methods of characterizing an analyte of interest. The methods can involve contacting the analyte with a population of nanoparticles to form a target composition, directing energy onto the target composition to form an analyte ion; and detecting the analyte ion with a mass spectrometer.

Also provided are methods of ionizing an analyte of interest. Methods of ionizing an analyte of interest can involve contacting the analyte with a population of nanoparticles to form a target composition, and pulsing a laser to direct energy onto the target composition. The energy can desorb and ionize the analyte, forming an analyte ion. Once ionized, the analyte of interest can be detected using methods known in the art. Accordingly, also provided are methods of detecting an analyte which can comprise ionizing the analyte according to the method described above, and detecting the analyte ion (e.g., using a mass spectrometer).

The methods described herein can involve contacting an analyte of interest with a population of nanoparticles to form a target composition. The nanoparticles can then serve as a matrix for MALDI mass spectrometry. The nanoparticles can comprise an oxide core and a plurality of ligands coordinated to the metal oxide core. The size, shape, and composition of the nanoparticles (e.g., chemical makeup of the metal oxide core, identity of the ligands coordinated to the oxide core, and combinations thereof) can be selected in view of a variety of factors, including the nature of the analyte of interest (e.g., analyte polarity), the desired characteristics of the mass spectrum (e.g., desired degree of fragmentation), the nature of the energy directed onto the target composition, and combinations thereof.

Nanoparticle Matrix

The nanoparticles disclosed herein comprise a metal oxide core and a plurality of ligands coordinated to the metal oxide core. The composition of the metal oxide core and/or the identity of the ligands coordinated to the core can be selected in view of a variety of factors, including the nature of the analyte of interest (e.g., analyte polarity), the desired characteristics of the mass spectrum (e.g., desired degree of fragmentation), the nature of the energy directed onto the target composition, and combinations thereof.

The metal oxide core can comprise, for example, $Fe^{2+}$, $Fe^{3+}$, a ferric oxide, ferrous oxide, a non-ferrous metal ferrite, or combinations thereof. The non-ferrous metal ferrite can comprise, by way of example, a zinc ferrite, a calcium ferrite, a magnesium ferrite, a manganese ferrite, a copper ferrite, a chromium ferrite, a cobalt ferrite, a nickel ferrite, a sodium ferrite, a potassium ferrite, a barium ferrite, or combinations thereof.

The disclosed nanoparticles are not silicone nanoparticles or titanium, zinc, tin or zirconium oxides.

Ligands

One or more ligands can be attached to the metal oxide core, for example, by coordination bonds. Ligands can also be associated with the oxide core via non-covalent interactions. The identity of the ligands can be selected in view of ligand-analyte interaction based on a number of factors, including the polarity or charge state of the analyte of interest. For example, in some examples, the ligands can individually be selected to be a hydrophilic, hydrophobic, or amphiphilic. In addition, the plurality of ligands can, in combination, be selected so as to provide a shell surrounding the oxide core which is hydrophilic, hydrophobic, or amphiphilic. The ligands can comprise iron coordinating or bonding functional groups, such as an amine, an alcohol, a thiol, an acid, a phosphine, a phosphine oxide, a siloxane, or combinations thereof. In certain examples, the ligands can comprise small molecules (e.g., molecules having a molecular weight of less than about 2,000 Daltons, less than about 1,500 Daltons, less than about 1,200 Daltons, less than about 1,000 Daltons, or less than about 800 Daltons). In certain examples, the ligands can comprise macromolecules, such as polymers, polysaccharides, polypeptides, and oligonucleotides.

In some cases, the ligands can comprise a carboxylic acid functional group, linked to an aliphatic (e.g. fatty acids) or aromatic moiety, or is part of a biomolecule or a polymer. Examples include but not limit to: saturated or unsaturated fatty acids, citric acid, lactic acid, gluconic acid, lactobionic acid, galacturonic acid, sialic acid, benzoic acid, salicylic acid, 2,5-dihydroxybenzoic acid, α-cyano-4-hydroxy-cinnamic acid, sinapinic acid, polyacrylic acid, biotin, or amino acids or peptides.

In some cases, the ligands can comprise a sulfonic acid or sulfonamide group, linked to an aliphatic (e.g. fatty acids) or aromatic moiety, or is part of a biomolecule or a polymer. Examples include but not limit to methanesulfonic acid, taurine, toluenesulfonic acid, cresidinesulfonic acid, perfluorooctanesulfonic acid, Nafion, sodium dodecylbenzenesulfonate, sulphapyridine, or sulphathiozol, chlorosulfolipids, sphingolipid sulfates, or cholesterol sulphates.

In some cases, the ligands can comprise a phosphor group linked to an aliphatic (e.g. fatty acids) or aromatic moiety, or is part of a biomolecule or a polymer. Examples include but not limit to organophosphates such as triphenylphosphate, cyclophosphamide, parathion, organophosphorous compounds, such as trioctylphosphine (TOP), triphenylphosphine (TPP), and 1,2-Bis(diphenylphosphino)ethane (DPPE), trioctylphosphine oxide (TOPO), and triphenylphosphine oxide (TPPO), orgnophosphites, phosphoryl peptides, phosphoryl glycans, glycerophospholipids, phosphosphingolipids, or oligonucleotides.

In some cases, the plurality of ligands comprises a catecholamine. Catecholamines are organic compounds comprising a catechol moiety and a side-chain comprising an amine group (e.g., a primary amine group). Other ligands can optionally be present on the particle surface.

The side chain of the catecholamine can comprise, for example, an alkyl, cycloalkyl, alkenyl, cycloalkenyl, alkynyl, cycloalkynyl, or optionally substituted with an aryl group. In some examples, the alkyl group comprises 30 or fewer carbon atoms in its backbone (e.g., $C_1$-$C_{30}$ for straight chain, $C_3$-$C_{30}$ for branched chain). For example, the alkyl group can comprise 20 or fewer carbon atoms, 12 or fewer carbon atoms, 8 or fewer carbon atoms, or 6 or fewer carbon atoms in its backbone. The term alkyl includes both unsubstituted alkyls and substituted alkyls, the latter of which refers to alkyl groups having one or more substituents, such as a halogen or a hydroxy group, replacing a hydrogen atom on one or more carbons of the hydrocarbon backbone. The alkyl groups can also comprise between one and four heteroatoms (e.g., oxygen, nitrogen, sulfur, and combinations thereof) within the carbon backbone of the alkyl group. Alkylaryl, as used herein, refers to an alkyl group substituted with an aryl group (e.g., an aromatic or heteroaromatic group, such as a phenyl group).

In some cases, the catecholamine can be a natural catecholamine, such as dopamine, L-DOPA (L-3,4-dihydroxyphenylalanine), norepinephrine, or a combinations thereof. The catecholamine can also be a synthetic derivative or analog of a natural catecholamine, such as carbidopa ((2S)-3-(3,4-dihydroxyphenyl)-2-hydrazino-2-methylpropanoic acid), benserazide ((RS)-2-amino-3-hydroxy-N'-(2,3,4-trihydroxybenzyl)propanehydrazide), 4-(2-amino-1-methylethyl)-1,2-benzenediol, 4-(1-Amino-2-propanyl)-1,2-benzenediol, 4-(2-amino-1-hydroxyethyl)-5-chloro-1,2-benzenediol, levonordefrin (4-[(1R,2S)-2-amino-1-hydroxypropyl]benzene-1,2-diol), or combinations thereof.

Other suitable ligands include, by way of example, amines, including alkylamines such as trioctylamine (TOA) and oleylamine, and alkylamine oxides such as lauryldimethylamine oxide, and aromatic amines such as histamine, 1,5-diaminonaphthalene, and amine groups from a biomolecule such as glutathione (GSH) or a polymer such as polyethyleneimine (PEI); thiols, such as dodecane thiol, hexadecane thiol, thioglycerol, dithiothreitol, and dithioerythreitol siloxanes, including alkylsiloxanes; silanes, including alkylsilanes; nitro compounds such as 3-nitrobenzyl alcohol, nitrobenzene, chloramphenicol, and beta-nitropropionic acid; and Good's buffers (MES, ADA, PIPES, ACES, cholamine chloride, BES, TES, HEPES, acetamidoglycine, tricine, glycinamide, and bicine).

In certain examples, the ligands on the disclosed nanoparticles do not selectively bind to the analyte being detected, e.g., antibodies. That is, in certain cases, the ligands do not have a binding affinity for the analyte.

Structure

In some cases, the smallest dimension (i.e., length, width, height, or diameter) of the nanoparticles can be about 150 nm or less (e.g., about 140 nm or less, about 130 nm or less, about 120 nm or less, about 110 nm or less, about 100 nm or less, about 90 nm or less, about 80 nm or less, about 70 nm or less, about 60 nm or less, about 50 nm or less, about 40 nm or less, about 30 nm or less, about 20 nm or less, about 10 nm or less, or about 5 nm or less). In certain cases, the nanoparticles comprise ultrathin nanostructures. In these examples, the smallest dimension of the nanoparticles can be about 4 nm or less (e.g., about 3 nm or less, or about 2 nm or less). In some examples, the smallest dimension of the nanoparticles is at least about 1 nm (e.g., at least about 5 nm, at least about 10 nm, at least about 20 nm, at least about 30 nm, at least about 40 nm, at least about 50 nm, at least about 60 nm, at least about 70 nm, at least about 80 nm, at least about 90 nm, at least about 100 nm, at least about 110 nm, at least about 120 nm, at least about 130 nm, or at least about 140 nm), with an upper limit of about 150 nm. In some examples, the nanoparticles possess at least one dimension of about 10 nm or less.

The smallest dimension of the nanoparticles can range from any of the minimum values described above to any of the maximum values described above. For example, the smallest dimension of the nanoparticles can range from about 1 nm to about 150 nm (e.g., from about 1 nm to about 125 nm, from about 1 nm to about 110 nm, from about 1 nm to about 100 nm, from about 1 nm to about 75 nm, from about 1 nm to about 50 nm, from about 1 nm to about 30 nm, from about 1 nm to about 10 nm, from about 50 nm to about 150 nm, from about 75 nm to about 150 nm, or from about 100 nm to about 150 nm). In certain cases, the nanoparticles comprise ultrathin nanostructures having a smallest dimension ranging from about 1 nm to about 4 nm (e.g., from about 1 nm to about 2 nm).

The nanoparticles can have a variety of shapes. For example, the nanoparticles can comprise nanospheres, nanocubes, nanobars, nanoplates, nanoflowers, nanowhiskers, nanotubes, nanospheres, or combinations thereof.

In some examples, the nanoparticles comprise nanocubes. Nanocubes are nanostructures which are essentially cubic in shape (i.e., they have approximately the same height, width, and depth dimensions, wherein no side is greater than about 1.5 times larger than another side). In certain examples, the nanoparticles comprise nanocubes having sides ranging in length from about 1 nm to about 150 nm (e.g., from about 1 nm to about 125 nm, from about 1 nm to about 110 nm, from about 1 nm to about 100 nm, from about 1 nm to about 75 nm, from about 1 nm to about 50 nm, from about 1 nm to about 30 nm, from about 1 nm to about 10 nm, from about 50 nm to about 150 nm, from about 75 nm to about 150 nm, or from about 100 nm to about 150 nm, from about 4 nm to about 50 nm, from about 4 nm to about 30 nm, from about 4 nm to about 10 nm, or from about 1 nm to about 4 nm).

In some examples, the nanoparticles comprise nanobars. Nanobars can be nanostructures which possess an elongated rectangular shape. The cross-sectional dimensions of nanobars (i.e., the nanobar's width and thickness) can be the same or different. In certain examples, the nanobars can be nanorods. Nanorods are nanostructures have an elongated spherical or cylindrical shape (e.g., the shape of a pill). Nanorods possess a circular, elliptical, or ovular cross-section, such that the width of the nanorods is equal to, for example, the diameter of the nanorod.

Nanobars can be defined by their aspect ratio, defined as the length of the nanobar divided by the width of the nanobar. Nanobars have an aspect ratio of at least about 1.5 (e.g., at least about 1.75, at least about 2.0, at least about 2.25, at least about 2.5, at least about 2.75, at least about 3.0, at least about 3.25, at least about 3.5, at least about 3.75, at least about 4.0, at least about 4.25, at least about 4.5, at least about 4.75, at least about 5.0, at least about 5.25, at least about 5.5, at least about 5.75, at least about 6.0, at least about 6.25, at least about 6.5, at least about 6.75, at least about 7.0, at least about 7.25, at least about 7.5, at least about 7.75, at least about 8.0, at least about 8.25, at least about 8.5, at least about 8.75, at least about 9.0, at least about 9.25, at least about 9.5, or at least about 9.75). In some examples, the nanobars have an aspect ratio that is about 10.0 or less (e.g., about 9.75 or less, about 9.5 or less, about 9.25 or less, about 9.0 or less, about 8.75 or less, about 8.5 or less, about 8.25 or less, about 8.0 or less, about 7.75 or less, about 7.5 or less, about 7.25 or less, about 7.0 or less, about 6.75 or less, about 6.5 or less, about 6.25 or less, about 6.0 or less, about 5.75 or less, about 5.5 or less, about 5.25 or less, about 5.0 or less, about 4.75 or less, about 4.5 or less, about 4.25 or less, about 4.0 or less, about 3.75 or less, about 3.5 or less, about 3.25 or less, about 3.0 or less, about 2.75 or less, about 2.5 or less, about 2.25 or less, about 2.0 or less, or about 1.75 or less).

Nanobars can have an aspect ratio ranging from any of the minimum values described above to any of the maximum values described above. For example, the nanobars can have an aspect ratio ranging from at least about 1.5 to about 10.0 (e.g., from at least about 1.5 to about 7.5, from at least about 1.5 to about 5.0, from at least about 1.75 to about 5.0, from at least about 2.0 to about 5.0, from at least about 2.0 to about 4.5, or from at least about 2.0 to about 4.0).

In certain examples, the nanobars have a length, width, and height ranging from about 1 nm to about 150 nm (e.g., from about 1 nm to about 125 nm, from about 1 nm to about 110 nm, from about 1 nm to about 100 nm, from about 1 nm to about 75 nm, from about 1 nm to about 50 nm, from about 1 nm to about 30 nm, from about 1 nm to about 10 nm, from about 50 nm to about 150 nm, from about 75 nm to about 150 nm, from about 100 nm to about 150 nm, from about 4 nm to about 50 nm, from about 4 nm to about 30 nm, from about 4 nm to about 10 nm, or from about 1 nm to about 4 nm).

In some examples, the nanoparticles comprise nanotubes. Nanotubes can be nanostructures which possess an elongated shape. The cross-sectional dimensions of nanotubes (i.e., the nanotubes's width and thickness) can be similar in magnitude, such that the nanotubes possess a circular, elliptical, or ovular cross-section.

Nanotubes can be defined by their aspect ratio, defined as the length of the nanotube divided by the width of the nanotube. Nanotubes can be distinguished from, for example, nanobars and nanorods by the magnitude of their aspect ratio. Nanotubes can have an aspect ratio of at least about 10 (e.g., at least about 11, at least about 12, at least about 13, at least about 14, at least about 15, at least about 16, at least about 17, at least about 18, at least about 19, at least about 20, at least about 21, at least about 22, at least about 23, or at least about 24). In some examples, the nanotubes have an aspect ratio that is about 25 or less (e.g., about 24 or less, about 23 or less, about 22 or less, about 21 or less, about 20 or less, about 19 or less, about 18 or less, about 17 or less, about 16 or less, about 15 or less, about 14 or less, about 13 or less, about 12 or less, or about 11 or less).

Nanotubes can have an aspect ratio ranging from any of the minimum values described above to any of the maximum values described above. For example, the nanotubes can have an aspect ratio ranging from about 10 to about 25 (e.g., from at least about 10 to about 20, from about 15 to about 25, from about 10 to about 15, or from about 20 to about 25).

In certain examples, the nanotubes can have a length, width, and/or height ranging from about 1 nm to about 150 nm (e.g., from about 1 nm to about 125 nm, from about 1 nm to about 110 nm, from about 1 nm to about 100 nm, from about 1 nm to about 75 nm, from about 1 nm to about 50 nm, from about 1 nm to about 30 nm, from about 1 nm to about 10 nm, from about 50 nm to about 150 nm, from about 75 nm to about 150 nm, from about 100 nm to about 150 nm, from about 4 nm to about 50 nm, from about 4 nm to about 30 nm, from about 4 nm to about 10 nm, or from about 1 nm to about 4 nm).

In some examples, the nanoparticles comprise nanowhiskers. Nanowhiskers are nanostructures which possess an elongated shape. The cross-sectional dimensions of nanowhiskers (i.e., the nanowhiskers's width and thickness) can be the same or different. In certain examples, the nanowhiskers can have an elongated, needle-like shape. Nanowhiskers can possess a circular, elliptical, or ovular cross-section, such that the width of the nanowhiskers is equal to, for example, the diameter of the nanowhiskers.

Nanowhiskers can be defined by their aspect ratio, defined as the length of the nanowhiskers divided by the width of the nanowhiskers. Nanowhiskers can be distinguished from, for example, nanobars, nanorods, and nanotubes by the magnitude of their aspect ratio. Nanowhiskers can have an aspect ratio of at least about 25 (e.g., at least about 30, at least about 35, at least about 40, at least about 45, at least about 50, at least about 55, at least about 60, at least about 65, at least about 70, at least about 75, at least about 80, at least about 85, at least about 90, or at least about 95). In some examples, the nanotubes have an aspect ratio that is about 100 or less (e.g., about 95 or less, about 90 or less, about 85 or less, about 80 or less, about 75 or less, about 70 or less, about 65 or less, about 60 or less, about 55 or less, about 50 or less, about 45 or less, about 40 or less, about 35 or less, or about 30 or less).

Nanowhiskers can have an aspect ratio ranging from any of the minimum values described above to any of the maximum values described above. For example, the nanowhiskers can have an aspect ratio ranging from about 25 to about 100 (e.g., from at least about 25 to about 50, from about 50 to about 100, from about 25 to about 75, or from about 25 to about 35).

In certain examples, the nanowhiskers can have a length, width, and/or height ranging from about 1 nm to about 150 nm (e.g., from about 1 nm to about 125 nm, from about 1 nm to about 110 nm, from about 1 nm to about 100 nm, from about 1 nm to about 75 nm, from about 1 nm to about 50 nm, from about 1 nm to about 30 nm, from about 1 nm to about 10 nm, from about 50 nm to about 150 nm, from about 75 nm to about 150 nm, from about 100 nm to about 150 nm, from about 4 nm to about 50 nm, from about 4 nm to about 30 nm, from about 4 nm to about 10 nm, or from about 1 nm to about 4 nm).

In some examples, the nanoparticles comprise nanoplates. Nanoplates are nanostructures which possess lateral dimensions (i.e., a height and width defined by edge lengths) that are substantially larger than the nanoplate's thickness. The height and width of the nanoplates can be approximately the same, or different.

Nanoplates can be defined by their aspect ratio, defined as the shortest lateral dimension of the nanoplate divided by the thickness of the nanoplate. Nanoplates can have an aspect ratio of at least about 5.0 (e.g., at least about 5.5, at least about 6.0, at least about 6.5, at least about 7.0, at least about 7.5, at least about 8.0, at least about 8.5, at least about 9.0, at least about 10.0, at least about 11.0, at least about 12.0, at least about 13.0, or at least about 14.0). In some examples, the nanoplates have an aspect ratio that is about 15.0 or less (e.g., about 14.0 or less, about 13.0 or less, about 12.0 or less, about 11.0 or less, about 10.0 or less, about 9.0 or less, about 8.5 or less, about 8.0 or less, about 7.5 or less, about 7.0 or less, about 6.5 or less, about 6.0 or less, or about 5.5 or less).

Nanoplates can have an aspect ratio ranging from any of the minimum values described above to any of the maximum values described above. For example, the nanoplates can have an aspect ratio ranging from at least about 5.0 to about 15.0 (e.g., from at least about 5.0 to about 12.0, from at least about 5.0 to about 10.0, or from at least about 6.0 to about 10.0).

In certain examples, the nanoparticles comprise nanoplates having a thickness ranging from about 1 nm to about 10 nm (e.g., from about 2 nm to about 10 nm, from about 3 nm to about 10 nm, from about 4 nm to about 10 nm, from about 5 nm to about 10 nm, from about 1 nm to about 8 nm, from about 2 nm to about 8 nm, from about 3 nm to about 8 nm, from about 4 nm to about 8 nm, from about 5 nm to about 10 nm, from about, or from about 1 nm to about 5 nm). In certain examples, the nanoparticles comprise nanoplates having lateral dimensions and a thickness ranging from about 1 nm to about 50 nm (e.g., from about 2 nm to about 50 nm, from about 3 nm to about 50 nm, from about 4 nm to about 50 nm, from about 5 nm to about 50 nm, from about 1 nm to about 30 nm, from about 2 nm to about 30 nm, from about 3 nm to about 30 nm, from about 4 nm to about 30 nm, from about 5 nm to about 30 nm, from about 1 nm to about 10 nm, from about 2 nm to about 10 nm, from about 3 nm to about 10 nm, from about 4 nm to about 10 nm, or from about 5 nm to about 10 nm).

In some examples, the nanoparticles comprise nanoflowers. Nanoflowers, so-named because their morphology often resembles a flower, are 3-dimensional nanostructures formed from the assembly of a plurality smaller crystal grains. The crystal grains can individually range in size from about 1 nm to about 10 nm. The resulting nanoflowers can have one or more dimensions ranging from about 1 nm to about 50 nm.

In certain examples, the nanoflowers have a length, width, and height ranging from about 1 nm to about 150 nm (e.g., from about 1 nm to about 125 nm, from about 1 nm to about 110 nm, from about 1 nm to about 100 nm, from about 1 nm to about 75 nm, from about 1 nm to about 50 nm, from about 1 nm to about 30 nm, from about 1 nm to about 10 nm, from about 50 nm to about 150 nm, from about 75 nm to about 150 nm, from about 100 nm to about 150 nm, from about 4 nm to about 100 nm, from about 5 nm to about 50 nm, from about 1 nm to about 10 nm, from about 50 nm to about 100 nm, from about 4 nm to about 10 nm, or from about 5 nm to about 10 nm).

In certain examples, the nanoparticles comprise a nanosphere having a diameter of from about 1 nm to about 150 nm (e.g., from about 1 nm to about 125 nm, from about 1 nm to about 110 nm, from about 1 nm to about 100 nm, from about 1 nm to about 75 nm, from about 1 nm to about 50 nm, from about 1 nm to about 30 nm, from about 1 nm to about 10 nm, from about 50 nm to about 150 nm, from about 75 nm to about 150 nm, from about 100 nm to about 150 nm, from about 4 nm to about 100 nm, from about 5 nm to about 50 nm, from about 1 nm to about 10 nm, from about 50 nm to about 100 nm, from about 4 nm to about 10 nm, or from about 5 nm to about 10 nm).

Additives

The disclosed nanoparticles can also be combined with an additive to assist in and enhance the ionization and desorption of certain analytes. Examples of suitable additives include acids like hydrochloric acid, acetic acid, formic acid, trifluoroacetic acid, citric acid, phosphoric acid, lactic acid, gluconic acid, glucuronic acid, tartaric acid, and bases like ammonium hydroxide, lithium hydroxide, potassium hydroxide, cesium hydroxide, and salts such as ammonium citrate, ammonium phosphate monobasic, ammonium tartrate, ammonium sulfate, ammonium acetate, lithium chloride, lithium fluoride, sodium chloride, potassium chloride, copper chloride, silver nitrate, silver trifluoroacetate, and the like. Additives can also be co-matrices such as 2,5-dihydroxy benzoic acid, 1,5-diaminonaphthalene, sinapinic acid, and the like, in applications of enhanced fragmentation. The additives can be added to nanoparticle solution at various concentrations (such as from about 0.1 to about 0.5%, from about 1 to about 50 mM) or applied as a separate layer below/above the nanoparticle or nanoparticle/sample layer.

Methods of Making the Nanoparticles

Suitable nanoparticles can be prepared using a variety of methods. Appropriate methods for preparing nanoparticles for use in the methods described herein can be selected in view of the desired characteristics of the nanoparticles (e.g., size, shape, composition, and combinations thereof). In some examples, the nanoparticles can be prepared by simply reducing ammonium iron citrate with hydrazine, forming spherical iron oxide nanoparticles or doped oxide ferrites when other doping ions are present. In some examples, the nanoparticles are prepared using a "heat-up" method. "Heat-up" methods can be used to prepare monodisperse populations of nanoparticles. The resulting nanoparticles can absorb UV/visible light, providing for energy transfer from laser photons to the analyte of interest. "Heat-up" methods for the preparation of nanoparticles can be used in the preparation of the nanoparticles herein. See, for example, International Publication No. WO 2012/050810, which is hereby incorporated by reference in its entirety for its teachings of nanoparticle synthesis. These general "heat up" methods can be performed with a desired ligand.

In some examples, the nanoparticles are prepared by a process that comprises (a) incubating a precursor complex comprising a metallic moiety and one or more ligands coordinated to the metallic moiety at a temperature of from about 100° C. to about 300° C. for a period of time effective to form the population of nanoparticles by thermal displacement of one or more of the ligands from the metallic moiety. In certain cases, the nanoparticles prepared by this method comprise ultrathin nanostructures having at least one dimension of from about 1 nm to about 4 nm (e.g., at least one dimension of from about 1 nm to about 3 nm, or at least one dimension of from about 1 nm to about 2 nm).

In some examples, the nanoparticles are prepared by a process that comprises (a) incubating a precursor complex comprising a metallic moiety and one or more ligands coordinated to the metallic moiety at a temperature of from about 100° C. to about 300° C. for a period of time effective to form a population of nuclei by thermal displacement of one or more of the ligands from the metallic moiety; and (b) heating the nuclei to a temperature of from greater than 300° C. to about 400° C. to form the population of nanoparticles.

The shape and size of the nanoparticles formed by these methods can be selected based on a number of factors, including the composition of the precursor complex (e.g., the identity and/or quantity of the ligands coordinated to the metallic moiety), the incubation conditions (e.g., incubation temperature, duration, or combinations thereof), and the heating conditions (e.g., heating temperature, duration, or combinations thereof). In some examples, the population of nanoparticles formed by these methods is monodisperse.

The precursor complex can comprise a metallic ion moiety and one or more ligands coordinated to the metallic ion moiety. The metallic moiety can comprise, for example, $Fe^{2+}$, $Fe^{3+}$, a ferric oxide, ferrous oxide, a non-ferrous metal ferrite, or combinations thereof. The non-ferrous metal ferrite can comprise, by way of example, a zinc ferrite, a calcium ferrite, a magnesium ferrite, a manganese ferrite, a copper ferrite, a chromium ferrite, a cobalt ferrite, a nickel ferrite, a sodium ferrite, a potassium ferrite, a barium ferrite, or combinations thereof.

The precursor complex can further comprise one or more ligands coordinated to the metallic moiety. The one or more ligands can be attached to the metallic moiety, for example, by coordination bonds. Ligands can also be associated with the metallic moiety via non-covalent interactions. In some cases, the precursor complex comprises a plurality of ligands. Suitable ligands include those described above.

Suitable precursor complexes, as well as methods of making suitable precursor complexes, are known in the art. For example, precursor complexes can be prepared by reacting a suitable metallic moiety with one or more ligands under suitable conditions. For example, mixed metal oleate complexes (e.g., Fe(III)/M(II) oleate complexes where M is, for example, $Zn^{2+}$, $Ca^{2+}$, $Mg^{2+}$, $Mn^{2+}$, $Cu^{2+}$, $Co^{2+}$, $Cr^{2+}$, $Ni^{2+}$, $Na^{+}$, $K^{+}$, or $Ba^{2+}$) can be prepared by reacting M-chloride and ferric chloride with sodium oleate.

Methods of Using Nanoparticle Matrix

The methods described herein can involve contacting an analyte of interest with a population of nanoparticles to form a target composition. The analyte of interest can be, for example, a lipid, a glycolipid, a phospholipid, a glycerolipid, a fatty acid, a glycan, a protein, a glycoprotein, a lipoprotein, a peptidoglycan, a proteoglycan, a peptide, a polynucleotide, an oligonucleotide, a polymer, an oligomer, a small molecule, lignin, petroleum (i.e., crude oil), a petroleum product, an organometallic compound, or combinations thereof. Analytes can be obtained from natural, environmental, biological, or synthetic sources. In some examples, the analyte is present in a complex mixture, such as a biological specimen or culture (e.g., microbiological cultures), that can include a mixture of lipids, proteins, carbohydrates, nucleic acids, etc.

In some cases, the analyte can be of synthetic origin. In some examples, the analyte can be present in a biological sample. The biological sample can be, for example, whole blood, blood products, serum, plasma, cells, umbilical cord blood, chorionic villi, amniotic fluid, cerebrospinal fluid, spinal fluid, lavage fluid (e.g., bronchoalveolar, gastric, peritoneal, ductal, ear, athroscopic), a biopsy sample, urine, feces, sputum, saliva, nasal mucous, prostate fluid, semen, lymphatic fluid, bile, tears, sweat, breast milk, breast fluid, embryonic cells and fetal cells. In some examples, the biological sample can be derived from animals, plants, bacteria, algae, fungi, viruses, etc. In other examples, the analyte can be present in an environmental sample. Environmental samples include environmental material such as surface matter, soil, water and industrial samples, as well as samples obtained from food and dairy processing instruments, apparatus, equipment, utensils, disposable and non-disposable items.

In some examples, the analytes can be an organometallic molecule. Organometallic compounds comprise an organic portion incorporated with one or more metal elements, or elements with metallic character, such as boron, silicon, and tellurium.

The analyte of interest and the population of nanoparticles can be contacted in any fashion so as to provide a suitable target composition for further use in conjunction with the methods described herein. For example, the analyte of interest and the population of nanoparticles can both be applied in solution form to a standard MALDI target. In some examples such as MALDI imaging applications, the analyte of interest is present in a sample, such as a tissue sample, and the population of nanoparticles is applied to the sample.

In the disclosed methods, the combination of nanoparticle, ligand, and additive can allow improved characterization of analytes by MALDI MS. The ligands of the disclosed nanoparticles do not, in some aspects, specifically bind to the analyte.

In some examples, the methods described herein can further involve contacting the analyte of interest and the population of nanoparticles with a second (non-nanoparticle) MALDI matrix, such as an organic matrix. Examples of suitable second MALDI matrices include 1,5-diaminonaphthalene (DAN), 2,5-dihydroxybenzoic acid (DHB), dithranol, 3,5-dimethoxy-4-hydroxycinnamic acid, 4-hydroxy-3-methoxycinnamic acid, α-cyano-4-hydroxycinnamic acid, picolinic acid, 3-hydroxy picolinic acid, citric acid, or combinations thereof. In these examples, the target composition can comprise the analyte of interest, the population of nanoparticles, and a second MALDI matrix. In other examples, the target composition does not include a second MALDI matrix.

Methods can further involve directing energy onto the target composition to form an analyte ion. Energy can be directed onto the composition, for example, from a laser positioned to direct energy onto the target composition. The laser can be pulsed to direct energy onto the target composition, desorbing and ionizing the analyte, forming an analyte ion. Commonly used lasers are nitrogen lasers (337 nm, 150 μJ per 3 ns pulse) and Nd:YAG frequency tripled laser (355 nm, 50 mJ per 5 ns pulse). In some examples, the energy can comprise radiation in the range of from about $10^5$ to about $10^7$ W $cm^{-2}$. The laser power and energy can be varied to provide desired mass spectral characteristics. For example, the laser power and energy can be tuned to provide the desired amount of ISD fragmentation in the resulting mass spectrum.

Once ionized, the analyte of interest can be detected using methods known in the art. For example, the analyte ion can be detected using a mass analyzer operably associated with the ionization source (i.e., mass spectrometry). Accordingly, also provided is an ionization source for use in conjunction with mass spectrometry. The ionization source can comprise a target composition comprising an analyte of interest and a population of nanoparticles as described above; a laser positioned to direct energy onto the target composition to desorb and ionize the analyte to form an analyte ion.

Mass spectrometry is a sensitive and accurate technique for separating and identifying molecules. Generally, mass spectrometers have two main components, an ion source for the production of ions and a mass-selective analyzer for measuring the mass-to-charge ratio of ions, which is and converted into a measurement of mass-to-charge ratio (m/z) for these ions. In some examples, a mass-distinguishable product can be charged prior to, during, or after cleavage. In some examples, a mass-distinguishable product that will be measured by mass spectrometry does not always require a charge since a charge can be acquired through the mass spectrometry ionization procedure. In mass spectrometry analysis, optional components of a mass-distinguishable product such as charge and detection moieties can be used to contribute mass to the mass-distinguishable product.

Suitable mass spectrometry methods include, for example, time-of-flight mass spectrometry (TOF), Fourier transform ion cyclotron resonance (FT-ICR) mass spectrometry, orbitrap mass spectrometry, and tandem mass spectrometry, which employs a combination of mass analysis techniques. While less preferred quadrupole ion trap (QIT) mass spectrometry may also benefit from the compositions disclosed herein. Varied mass spectrometry methods provide flexibility in customizing detection protocols for specific analytes and analyte mixtures. In some examples, mass spectrometers can be programmed to transmit all ions from the ion source into the mass spectrometer either sequentially or at the same time. In other examples, mass spectrometers can be programmed to select ions of a particular mass for transmission into the mass spectrometer while blocking other ions. In other examples, multiple mass analyzers can be used.

The ability to precisely control the movement of ions in a mass spectrometer can aid in increasing the flexibility of detection protocols. Variable and customizable detection protocols can be aid in analyzing large number of mass-distinguishable products, for example, from a multiplex experiment or a complex mixture. For example, in a multiplex experiment with a large number of mass-distinguishable products individual reporters can be analyzed/detected separately. In some examples, uncleaved or partially-cleaved analytes can be selected out of the assay, thereby reducing the background.

In many cases, mass spectrometers can resolve ions with small mass differences and measure the mass of ions with a high degree of accuracy. Therefore, mass-distinguishable products of similar masses can be used together in the same experiment since the mass spectrometer can, in many cases, differentiate the mass of closely related analytes. In some cases, the high degree of resolution and mass accuracy achieved using mass spectrometry methods allows the use of complex analyte mixtures. In some cases, known tags or probes can be added to a mixture as standards to aid in characterization of analytes.

In some examples, for quantification, controls can be used to provide a signal in relation to the amount of the analyte that can be present or introduced. In some cases, a control can allow conversion of relative mass signals into absolute quantities, for example by addition of a known quantity of a mass tag, mass probe, or mass label to a sample before detection of the mass-distinguishable products. Any control tag, probe, or label that does not interfere with detection of the mass-distinguishable products can be used for normalizing the mass signal. Such standards preferably have separation properties that are different from those of any of the molecular tags in the sample, and could have the same or different mass signatures.

In some examples, mass spectrometers can achieve high sensitivity by using a large portion of the ions that are formed by the ion source and efficiently transmitting these ions through one or more mass analyzer(s) to one or more detector(s). This can allow the analysis of limited amounts of sample using mass spectrometry. This can be performed in a multiplex experiment where the amount of each mass-distinguishable product species can be small.

In some mass spectrometry methods, the movement of gas-phase ions can be precisely controlled using electromagnetic fields. For some mass analyzers, the movement of ions in these electromagnetic fields is proportional to the m/z of the ion, allowing the measurement of m/z and the determination of mass. For the time-of-flight mass analyzer, which is the most common analyzer coupled with MALDI, electromagnetic fields are used to accelerate ions into a field free flight tube region where their velocities allow determination of mass. During the course of m/z measurement, ions are transmitted with high efficiency to particle detectors that record the arrival of these ions. The quantity of ions at each m/z is demonstrated by peaks on a graph where the x axis is m/z and the y axis is relative abundance. Different mass spectrometers have different levels of resolution; that is, the ability to resolve peaks between ions closely related in mass. In some variations the resolution can be defined as $R=m/\Delta m$, where m is the ion mass at peak apex and $\Delta m$ is the width of the peak at half of its height. For example, a mass spectrometer with a resolution of 1000 can resolve an ion with an m/z of 100.0 from an ion with a m/z of 100.1. In addition, the increased resolution results in sharp, narrow peaks whose m/z can be known very accurately. In some cases, enhanced resolution can provide sufficient mass accuracy to allow the chemical formula of compounds to be determined.

The mass spectrometers described herein have one or more of the following components: an ion source as described above (e.g., a target composition comprising an analyte of interest and a population of nanoparticles; a laser positioned to direct energy onto the target composition to desorb and ionize the analyte to form an analyte ion; and an electric field configured to direct the analyte ion to a mass analyzer), a mass analyzer, a detector, a vacuum system, and instrument-control system, and a data system. Differences between these components can help define a specific mass spectrometer and its capabilities. Examples of suitable mass analyzers include quadrupoles, RF multipoles, and time-of-flight (TOF), ion cyclotron resonance (ICR), ion trap, linear ion trap, Orbitrap, and sector mass analyzers. Examples of tandem mass analyzers include TOF-TOF, trap-TOF, triple quadrupoles, and quadrupole-linear ion traps (e.g., a 4000 Q TRAP™ LC/MS/MS system, or a Q TRAP™ LC/MS/MS system), a quadrupole TOF (e.g., a QSTAR™ LC/MS/MS system).

Time-of-flight (TOF) mass spectrometry uses a time-of-flight mass analyzer. For this method of m/z analysis, an ion is first given a fixed amount of kinetic energy by acceleration in an electric field (generated by high voltage). Following acceleration, the ion enters a field-free or "drift" region where it travels at a velocity that is inversely proportional to its m/z. Therefore, ions with low m/z travel more rapidly than ions with high m/z. The time required for ions to travel the length of the field-free region is measured and used to calculate the m/z of the ion. TOF mass analysis required that the set of ions being studied is introduced into the analyzer at the same time. Accordingly, TOF mass analysis can be well suited to ionization techniques such as MALDI which can, in most cases, produce ions in short well-defined pulses. TOF is the most common mass analyzer employed with MALDI. Another consideration of TOF is to control velocity spread produced by ions that have variations in their amounts of kinetic energy. The use of longer flight tubes, ion reflectors, higher acceleration voltage, or delayed ion extraction can help minimize the effects of velocity spread. In many cases, time-of-flight mass analyzers can have a high level of sensitivity and a much wider m/z range than quadrupole or ion trap mass analyzers. In some examples, data can be acquired quickly with time-of-flight of mass analyzers because scanning of the mass analyzer is unnecessary.

Fourier transform ion cyclotron resonance (FT-ICR) mass spectrometry is often coupled with MALDI. For this method of m/z analysis, ions are trapped in a high magnetic field and the field causes them to move in cyclic orbits inside of an FT-ICR cell. The frequency (cycles per second) of this ion motion is measured and this value, along with the magnetic field strength, provides information on the m/z of the ions of interest. When coupled with MALDI, ions can be produced either by exposing a sample on a target inside of the FT-ICR cell to the laser beam or the MALDI source can be external to the magnetic field and electrostatic focusing is used to move ions into the cell for analysis. FT-ICR mass analysis required that the set of ions being studied be introduced into the cell at the same time in a pulsed form. Thus, FT-ICR mass analysis can be well suited to ionization techniques such as MALDI which can, in most cases, produce ions in short well-defined pulses. Another consideration of FT-ICR is that the technique is the highest resolution form of mass spectrometry and, consequently, allows the measurement of the molecular masses of analytes to a very high accuracy. Also, because FT-ICR is a trapping form of mass spectrometry, ions produced by MALDI can be retained for long periods of time (milliseconds to minutes) and subjected to tandem mass spectrometry techniques, such as ion/molecule reactions, collision-induced dissociation, photodissociation, and electron capture dissociation, which are designed to probe the chemical structures of the samples.

While less common with MALDI, quadrupole mass spectrometry uses a quadrupole mass filter or analyzer. This type of mass analyzer can be composed of four rods arranged as two sets of two electrically connected rods. A combination of rf and dc voltages are applied to each pair of rods which produces fields that cause an oscillating movement of the ions as they move from the beginning of the mass filter to the end. The result of these fields is the production of a high-pass mass filter in one pair of rods and a low-pass filter in the other pair of rods. Overlap between the high-pass and low-pass filter leaves a defined m/z that can pass both filters and traverse the length of the quadrupole. This m/z is selected and remains stable in the quadrupole mass filter while all other m/z have unstable trajectories and do not remain in the mass filter. A mass spectrum results by ramping the applied fields such that an increasing m/z is selected to pass through the mass filter and reach the detector. In addition, quadrupoles can also be set up to contain and transmit ions of all m/z by applying an rf-only field. This allows quadrupoles to function as a lens or focusing system in regions of the mass spectrometer where ion transmission is needed without mass filtering. This will be of use in tandem mass spectrometry as described further below.

Ion trap mass spectrometry uses a quadrupole ion trap (QIT) mass analyzer. Ion trap mass analyzers employ fields which are applied so that ions of all m/z are initially trapped and oscillate in the mass analyzer. Ions enter the ion trap from the ion source through a focusing device such as an octapole lens system. Ion trapping takes place in the trapping region before excitation and ejection through an electrode to the detector. Mass analysis is accomplished by sequentially applying voltages that increase the amplitude of the oscillations in a way that ejects ions of increasing m/z out of the trap and into the detector. In contrast to (linear) quadrupole mass spectrometry, all ions are retained in the fields of the mass analyzer except those with the selected m/z. Control of the number of ions in the trap can be accomplished by varying the time over which ions are injected into the trap.

In some examples, the mass spectrometer can comprise a mass analyzer programmed to analyze a defined m/z or mass range. Since the mass range of cleaved mass-distinguishable products can be known prior to many assays, a mass spectrometer can be programmed to transmit ions of the projected mass range while excluding ions of a higher or lower mass range. The ability to select a mass range can decrease the background noise in the assay and thus increase the signal-to-noise ratio. In addition, a defined mass range can be used to exclude analysis of any un-cleaved or un-ionized analytes. Therefore, in some examples, the mass spectrometer can be used as a separation step as well as detection and identification of the mass-distinguishable products.

In other examples, tandem mass spectrometry can be used, wherein combinations of mass analyzers are employed. Tandem mass spectrometry can use a first mass analyzer to separate ions according to their m/z in order to isolate an ion of interest for further analysis. The isolated ion of interest can then be broken into fragment ions (called collisionally activated dissociation or collisionally induced dissociation) and the fragment ions analyzed by a second mass analyzer. In some cases tandem mass spectrometry systems are called tandem-in-space systems because two mass analyzers can be separated in space, for example by a collision cell. Tandem mass spectrometry systems also include tandem-in-time systems where one mass analyzer is used; however, one or more mass analyzer(s) is used sequentially to isolate an ion, induce fragmentation, and perform mass analysis.

Mass spectrometers in the tandem in time category can have one mass analyzer that performs different functions at different times. For example, an ion trap mass spectrometer can be used to trap ions of all m/z. A series of rf scan functions are applied which ejects ions of all m/z from the trap except the m/z of ions of interest. After the m/z of interest has been isolated, an rf pulse is applied to produce collisions with gas molecules in the trap to induce fragmentation of the ions. Then the m/z values of the fragmented ions are measured by the mass analyzer. Ion cyclotron resonance instruments, also known as Fourier transform mass spectrometers, are an example of tandem-in-time systems and are commonly employed with MALDI.

Tandem mass spectrometry experiments can be performed by controlling the ions that are selected for further dissociation. In a tandem mass spectrometry product ion scan, the ions of interest are mass-selected in the first mass analyzer or in time and then fragmented, either in the source, the analyzer, or in a collision cell. The ions formed are then mass analyzed by a second mass analyzer or, for tandem-in-time systems, as a function of time in the analyzer. The use of tandem mass spectrometry provides structurally informative fragment ions that can be used to more accurate determine the structure of the compound being analyzed. The methods and systems described herein can be applied to various fields of mass analysis, including the analysis of glycans and glycoconjugates (e.g., glycoproteins, glycolipids, and proteoglycans), proteins, lipids, small molecules (e.g., pharmaceuticals), oligomers, and polymers. For example, the methods described herein can be used to detect, sequence, and/or image proteins, glycans, glycoconjugates, polynucleotides, and oligonucleotides; to detect and/or image drugs, biomarkers, and metabolites; and to characterize polymers, including synthetic polymers such as fluoropolymers. The methods described herein can be used, for example, in healthcare applications (e.g., in basic research, in clinical diagnosis, and in patient monitoring), in pharmaceutical sciences, in food sciences (e.g., in quality control efforts), and in the polymer industry (e.g., in quality control applications).

The methods described herein can also be used in MALDI imaging. MALDI imaging involves the use of matrix-assisted laser desorption ionization as a mass spectrometry imaging technique to characterize the composition of a sample (e.g., a thin, typically 5 μm thick tissue section) at various spots across the sample surface. In MALDI imaging, the sample to be analyzed is placed on a stage. A layer of matrix (e.g., a population of nanoparticles as described above) is deposited on the sample surface. The sample is scanned in a raster manner, with a laser firing at specific locations or ranges of locations spaced along the raster pattern. Mass spectra are acquired at each location or range of locations. In this way, MALDI imaging can be used to determine the spatial distribution of analytes in a sample (e.g., analytes of clinical significance within a thin slice of animal or plant tissue, such as proteins, peptides, drug candidate compounds and their metabolites, biomarkers or other chemicals). As such, MALDI imaging can be used, for example, for putative biomarker characterization and drug development.

Kits

Also disclosed are kits that comprise the disclosed nanoparticles, including the ligands, and additives in a powder form or as a suspension. Such kits can be employed for sample preparation for a large number of different analytes for MALDI mass spectrometry analysis. In one example, disclosed is a kit for analyzing carbohydrates that comprises a plurality of ferrite nanoparticles with glutathione ligands and optionally an additive. In another example, disclosed is a kit for analyzing proteins that comprises a plurality of ferrite nanoparticles with polyacrylic acid ligands, and optionally an additive. In another example, disclosed is a kit for analyzing polymers that comprises a plurality of ferrite nanoparticles with dopamine acid ligands, and optionally an additive. In another example, disclosed is a kit for analyzing small molecules that comprises a plurality of ferrite nanoparticles with polyacrylic acid ligands or glutathione ligands, and optionally an additive. Instructions for using the nanoparticles can also be included in the kit.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Example 1

Glycan Structural Characterization Using Nanoparticle Matrices

Glycans and glycoconjugates with protein and lipids are involved in various biological processes such as energy storage, cell-cell communication, and membrane transport. Glycans and glycoconjugates also play major roles in many diseases and disorders of clinical significance, including diabetes, neurodegenerative diseases, and cancer.

Glycans and glycoconjugates can be characterized using MALDI in-source-decay (ISD) with traditional organic matrices. When traditional organic matrices are used, one primarily observes labile glycosidic bond cleavages for sodiated glycans. By increasing the laser intensity or using an oxidizing organic matrix, cross-ring cleavages can also be observed.

A variety iron oxide nanoparticles with various ligands covalently bound to the surface were evaluated as MALDI matrices for glycan analysis with enhanced ISD fragmentations. Specifically, the iron oxide nanoparticles were synthesized using a modified "heat-up" method. In brief, iron oleate complex, the reaction precursor was first prepared by reacting ferric chloride ($FeCl_3$) with sodium oleate in a solvent mixture (hexane/ethanol/de-ionized water) at 65° C. for four hours. Subsequently, the iron oxide nanoparticles were synthesized by heating the precursor in 1-octadecene to desirable temperature in the presence of capping molecules. After synthesis, the nanoparticles were transferred into water through a ligand exchange method. The nanoparticles were further washed 3 times with DI water through precipitation and re-dispersion cycles and dispersed in water at 1 mg/mL. To prevent nanoparticle aggregation in water, HCl or NaOH was added to a final concentration of 20 mM.

Iron oxide nanoparticles capped with a variety of ligands, including oleic acid (OA), glutathione (GSH), dopamine (Dopa), L-3,4-dihydroxyphenylalanine (Ldopa), histamine (His), polyacrylic acid (PAA), and polyethyleneimine (PEI), were evaluated. Dopa- and GSH-capped nanoparticle matrices showed abundant cross ring and glycosidic cleavages. GSH-capped nanoparticles also provided improved limits of detection. Based on these initial analyses, GSH-capped nanoparticles were used as a matrix for subsequent glycan ISD studies.

MALDI ISD experiments were performed on maltoheptaose, isomaltotriose, lacto-N-difucohexaose I (LNDFHI), α-cyclodextrin, and β-cyclodextrin using a GSH-capped nanoparticle matrix.

The MALDI ISD experiment was performed on a Bruker ULTRAFLEX™ MALDI-TOF instrument equipped with a nitrogen laser (337 nm, 150 μJ per 3 ns). All glycan samples were prepared at 0.1 mg/mL in water, and mixed with a GSH-capped nanoparticle matrix (0.1 mg/mL in water, 20 mM NaOH) or DHB matrix (5 mg/mL, 50/50 ACN/water, 0.1% TFA) at 1:1 ratio. One μL of the mixed solution was then applied to a MALDI anchorchip target. On target wash with $CHCl_3$/MeOH (v/v, 2/1) was applied to remove impurities remained in the GSH-capped nanoparticle matrix. The mass spectra were taken in reflectron and linear mode, with 200 scans. The laser power is around 45-60% attenuation of the maximum power, with the maximum being on the order of ~150 μJ per 3 ns pulse.

$^{18}O$ labeling on the reducing end was conducted for maltoheptaose, isomaltotriose, and LNDFHI. 2.7 mg of 2-aminopyridine was added to 1 mL of anhydrous methanol to make the catalyst solution. 1.5 μL of catalyst solution, 20 μL of $H_2{}^{18}O$ (97%), and 0.8 μL of acetic acid were added to 1 μg of dry native glycans. The mixture was incubated at 40° C. for 16 hours and then used directly for MALDI analysis.

FIG. 1 shows the mass spectral comparison of maltoheptaose, showing the ISD enhancement of GSH nanoparticle matrix compared to traditional organic matrix, 2,5-dihydroxy benzoic acid (DHB). The upper spectrum of FIG. 1 also demonstrates that rich fragments are obtained in low mass region with GSH nanoparticle matrix, whereas this region is covered by noisy matrix background ions with DHB as the matrix.

Figure 2:
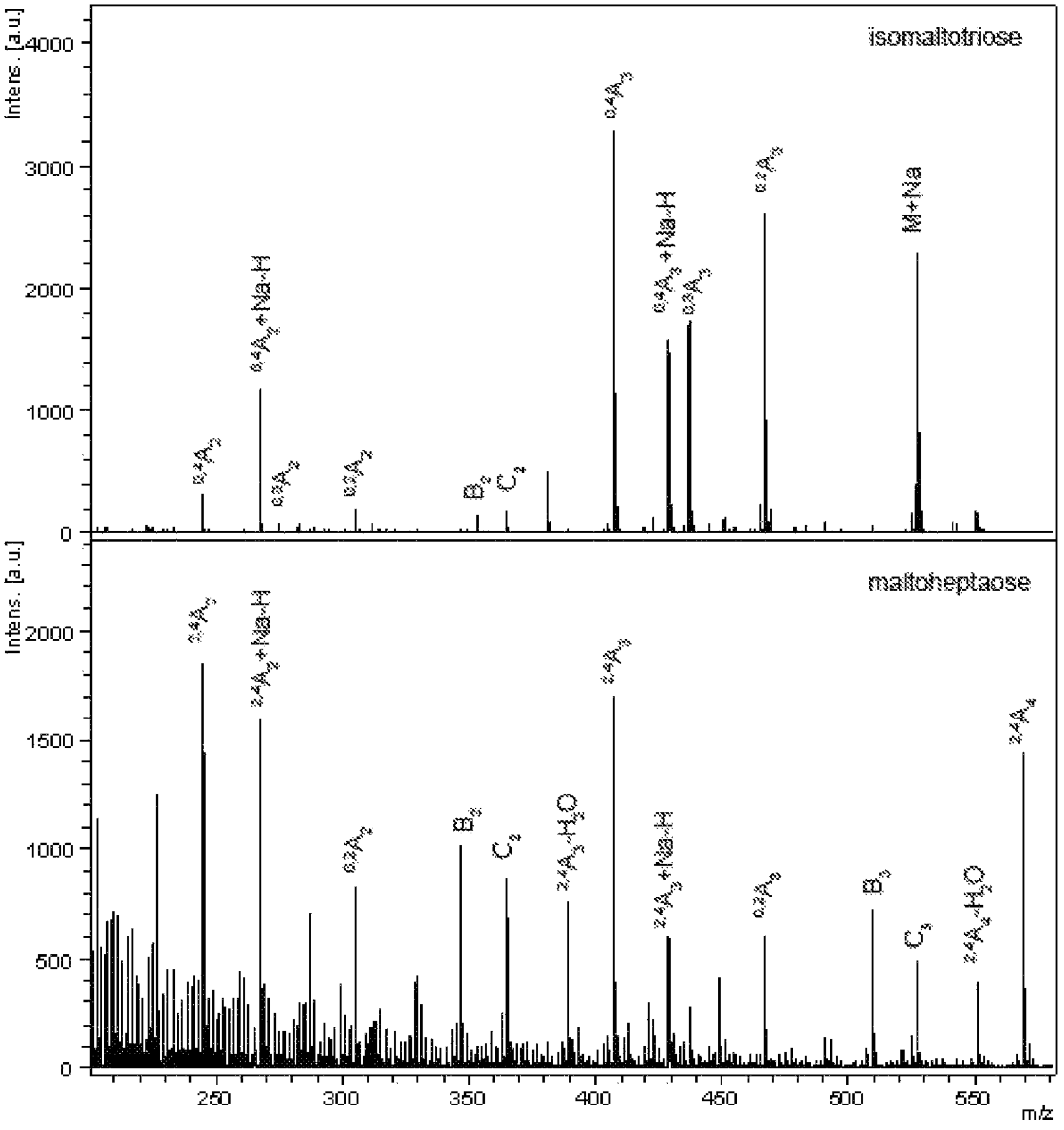
FIG. 2 contains MALDI/TOF ISD mass spectra of isomaltotriose and maltoheptose acquired using a GSH-capped nanoparticle matrix. The labeled peaks show different cleavage patterns regarding different linkage types (1-6 versus 1-4).
Figure 3:
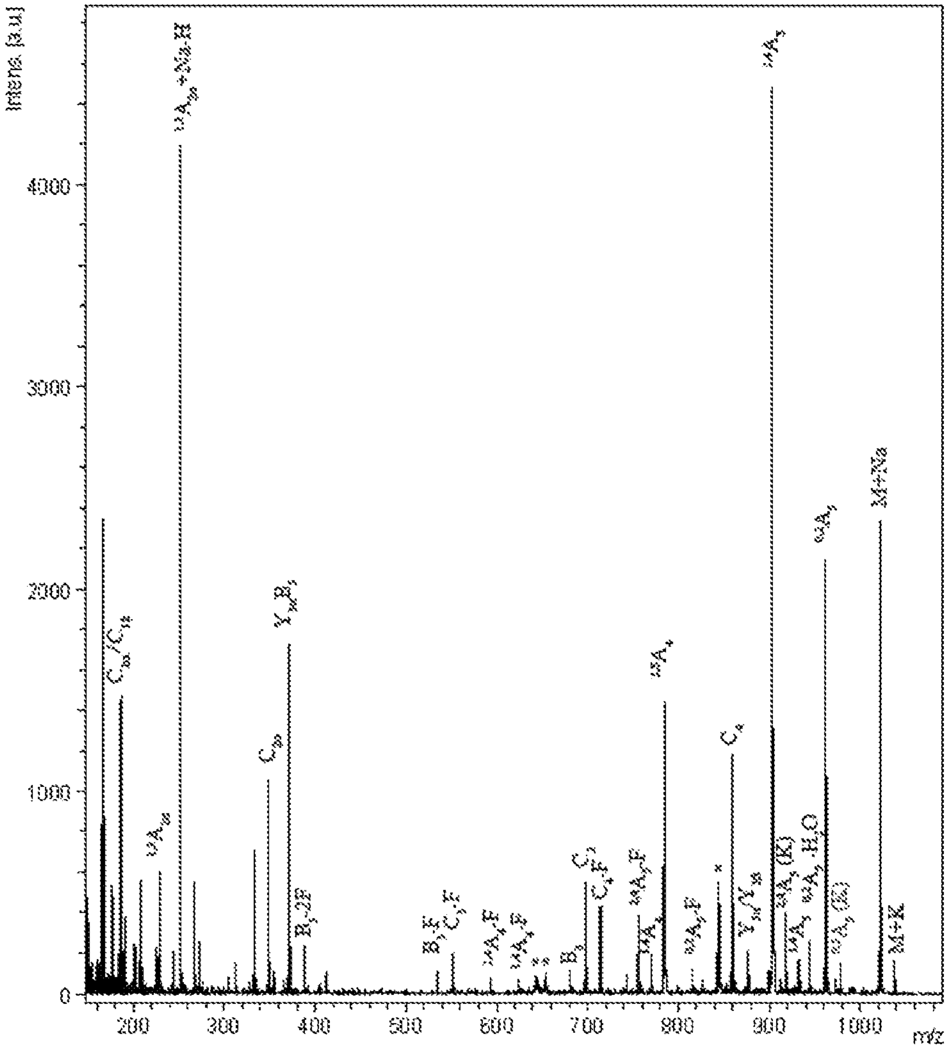
FIG. 3 is a MALDI/TOF ISD mass spectrum of lacto-N-difucohexaose I (LNDFHI) acquired using a GSH-capped nanoparticle matrix. The blank area in the spectrum indicates missing cross-ring cleavages at the GlcNAc branch point. Fucose loss (−F or −2F) or complete branch chain loss ($Y_{3\alpha}B_3$) from fragments is also visible.

The ISD spectra of glycans show unique cross-ring fragmentation features. FIG. 2 shows MALDI/TOF ISD mass spectra of isomaltotriose (top) and maltoheptose (bottom) acquired using a GSH-capped nanoparticle matrix. Maltoheptaose and isomaltotriose both are α-D-glucosyl sugars with different linkage type (1-4 versus 1-6). As shown in FIG. 2, their linkage difference corresponds to different cross ring cleavage patterns ($^{2,4}A$ and $^{0,2}A$ versus $^{0,4}A$, $^{0,3}A$, and $^{0,2}A$). Because the reducing end and non-reducing end product ions for maltoheptaose and isomaltotriose are degenerate in mass, $^{18}O$ labeling of the anomeric carbon was performed to clarify assignment ambiguity. After $^{18}O$ labeling, product ions from the reducing end (Y, Z, and X) experience a mass shift of 2 Da, while the masses of product ions from the non-reducing end (B, C, and A) are unchanged. Both maltoheptaose and isomaltotriose $^{18}O$ labeling produced only very slight ion intensity growth for peaks 2 Da higher than the ambiguous $C_n/Y_n$ product ions, indicating that the majority of the observed glycosidic and cross-ring product ions originate from the non-reducing end (B, C, and A). Thus, ambiguous $C_n/Y_n$ ions are labelled as $C_n$ in the mass spectra. In the ISD spectra of LNDFHI (see FIG. 3), the $^{18}O$ labeling results indicate that there are no distinctive X cleavages by ISD and that A cleavages dominate the cross-ring fragmentation. The branch point GlcNAc shows no cross ring fragmentations, possibly because that the multiple glycosidic bonds cleave more readily. Further fucose loss or complete branch chain loss from fragments is also observed.

Figure 4:
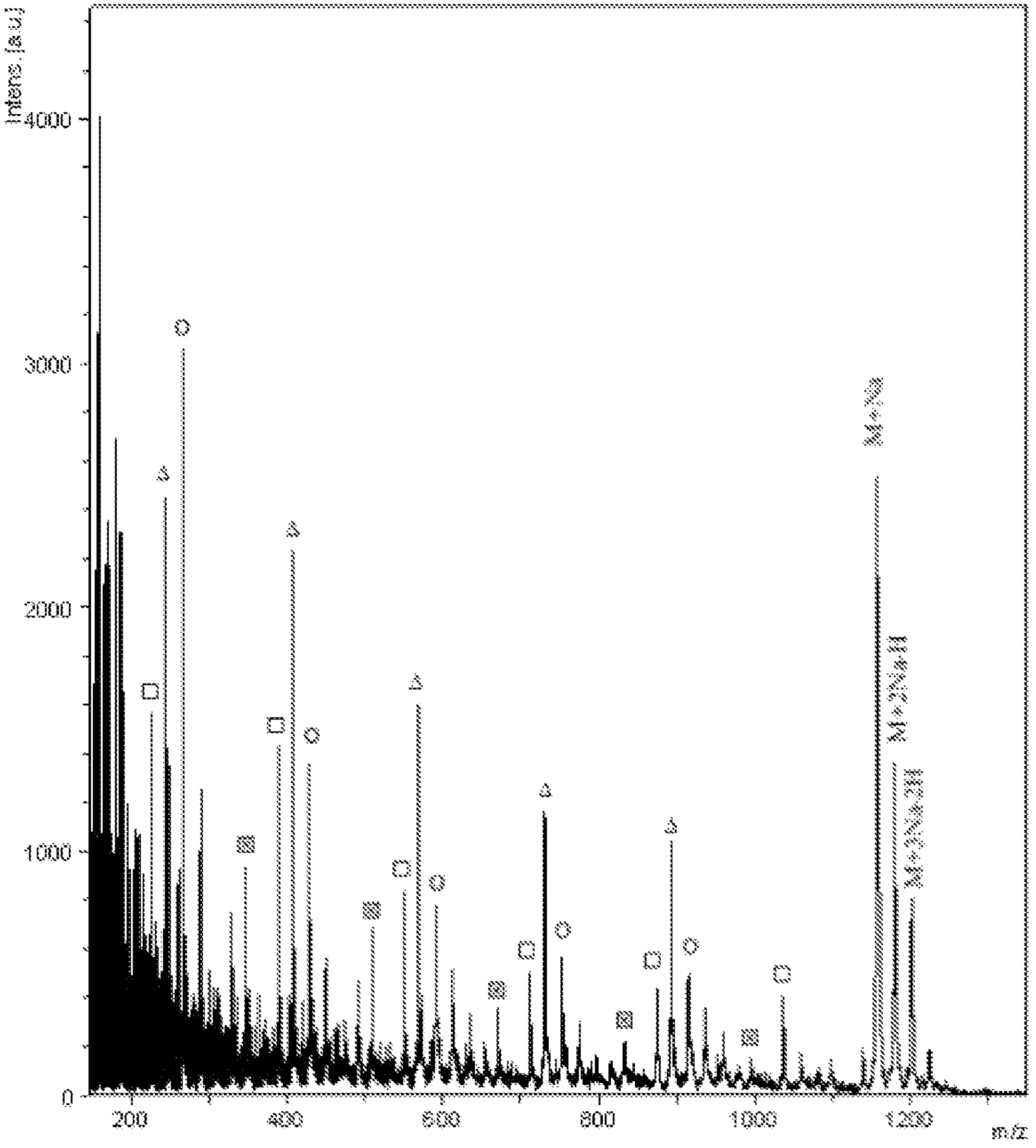
FIG. 4 is a MALDI/TOF ISD mass spectrum of β-cyclodextrin acquired using a GSH capped nanoparticle matrix. The fragmentation shows consecutive sugar unit loss by glycosidic bond cleavages ( ) and $^{2,4}$A-Z( ) or $^{2,4}$A-Y(Δ) type cleavages from the $[M+Na]^+$ precursor ions. Di-sodium attached precursor ions also produce $^{2,4}$A-Y type cleavages (o).

FIG. 4 shows the MALDI/TOF ISD mass spectrum of β-cyclodextrin acquired using a GSH-capped nanoparticle matrix. Sodiated cyclodextrins exhibit consecutive sugar unit loss by glycosidic bond cleavages. Ion series formed by a $^{2,4}A$ cleavage together with a Z or Y cleavage are also observed. The $^{2,4}A$-Z/Y type cleavage have not previously been reported for cyclodextrins in ISD experiments (see FIG. 4).

Example 2

Structural Characterization of Proteins Using Nanoparticle Matrices

Proteomics, the study of the structure, function, and interactions of proteins from a particular cell, tissue, or organism, has undergone explosive growth in the past decade because of the importance of proteins in biological processes and disease controls. For example, the applications of proteomics in cancer management include biomarker and therapeutic target discovery, patient monitoring, and therapy personalization. Mass spectrometry has become the major instrumentation in protein identification and quantification.

There are two major strategies for sequencing proteins, "bottom-up" and "top-down." In the "bottom-up" approach, proteins are first enzymatically digested before MS analysis or tandem mass spectrometry (MS/MS) sequencing. In comparison, in the "top-down" approach, the proteins are directly fragmented in the gas phase. The "top-down" approach eliminates the sample digestion step and is also applicable for MALDI imaging to localize protein distributions in biological tissue samples. Currently, the "top-down" approach is limited by the fragmentation efficiency for large proteins.

The ability of nanoparticle matrices to detect proteins and enhance ISD spectra of proteins was evaluated. The MALDI experiment was performed on a Bruker ULTRAFLEX™

MALDI-TOF instrument equipped with a nitrogen laser (337 nm, 150 μJ per 3 ns). The mass spectra were taken in linear mode, with 200 scans. The laser power is around 45-60% attenuation. For the cytochrome c sample (1 mg/mL in water), one μL of 1 mg/mL PAA-capped nanoparticles in water with 0.1% $NH_4OH$ was applied onto the MALDI target and dried, one μL of 3 mg/mL citric acid in water was then applied and dried, and finally, one μL of cytochrome c was applied and dried. For the ubiquitin sample (1 mg/mL in water), DAN matrix was prepared as a saturated solution in 20% ACN with 0.1% $NH_4OH$, a PAA-capped nanoparticle matrix was prepared as 1 mg/mL solution in water with 0.1% $NH_4OH$. One μL of DAN:ubiquitin at 2:1 (v/v) or DAN:ubiquitin:PAA-capped nanoparticle at 2:1:1 (v/v/v) sample was applied on stainless steel target and dried. For [Met-OH]-substance P sample, a 0.02 mg/mL thioglycerol-capped nanoparticle matrix in water was mixed with 0.1 mg/mL [Met-OH]-substance P in water at 1:1 ratio. One μL aliquot of the solution was then spotted onto an AnchorChip target and dried.

Figure 5:
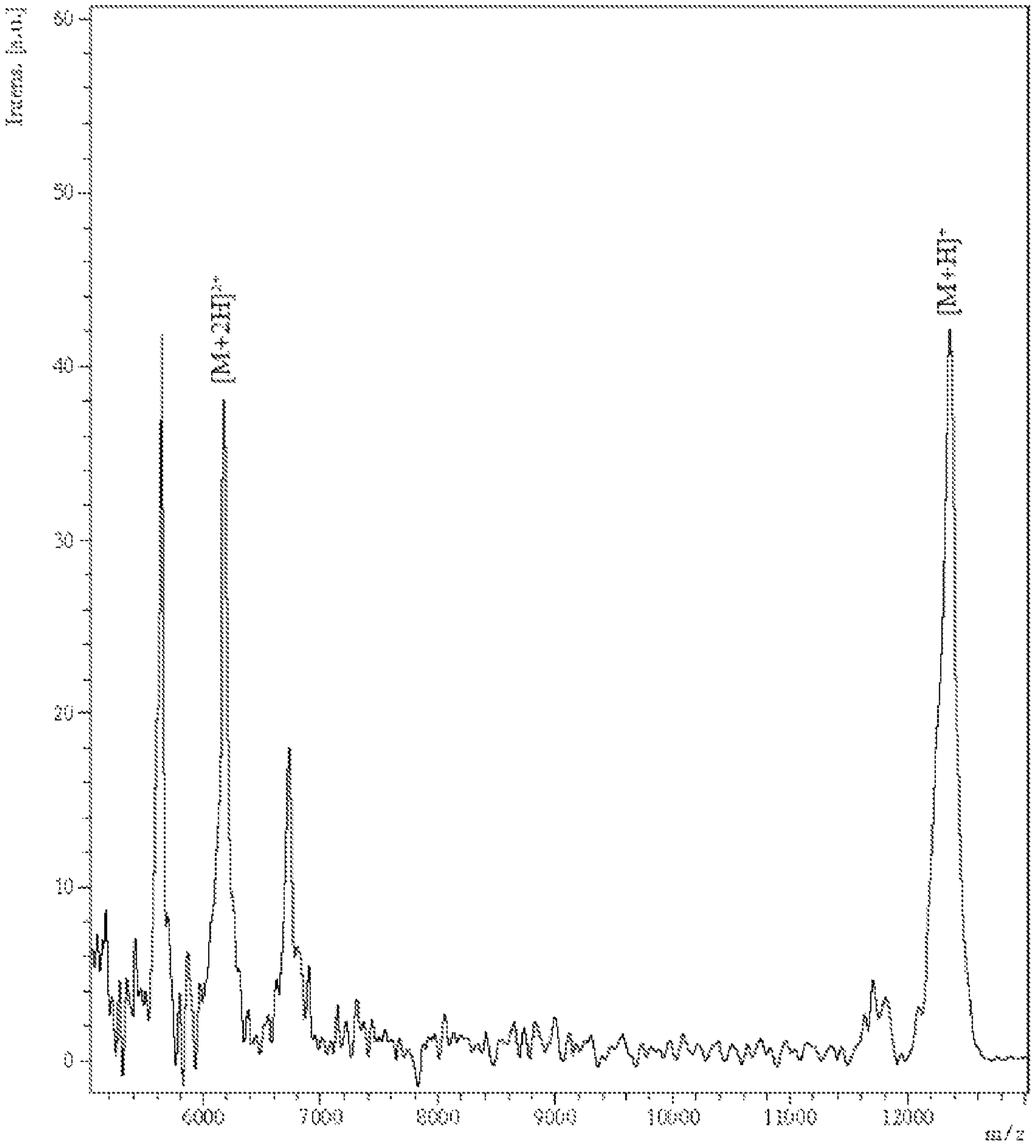
FIG. 5 is a MALDI/TOF mass spectrum of cytchrome c acquired using a polyacrylic acid (PAA)-capped nanoparticle matrix with citric acid as co-matrix. One μL of 1 mg/mL PAA-capped nanoparticles with 0.1% $NH_4OH$ was applied onto the MALDI target and dried, one μL of 3 mg/mL citric acid was then applied and dried, and finally, 1 μL of 1 mg/mL cytochrome c was applied and dried.
Figure 6:
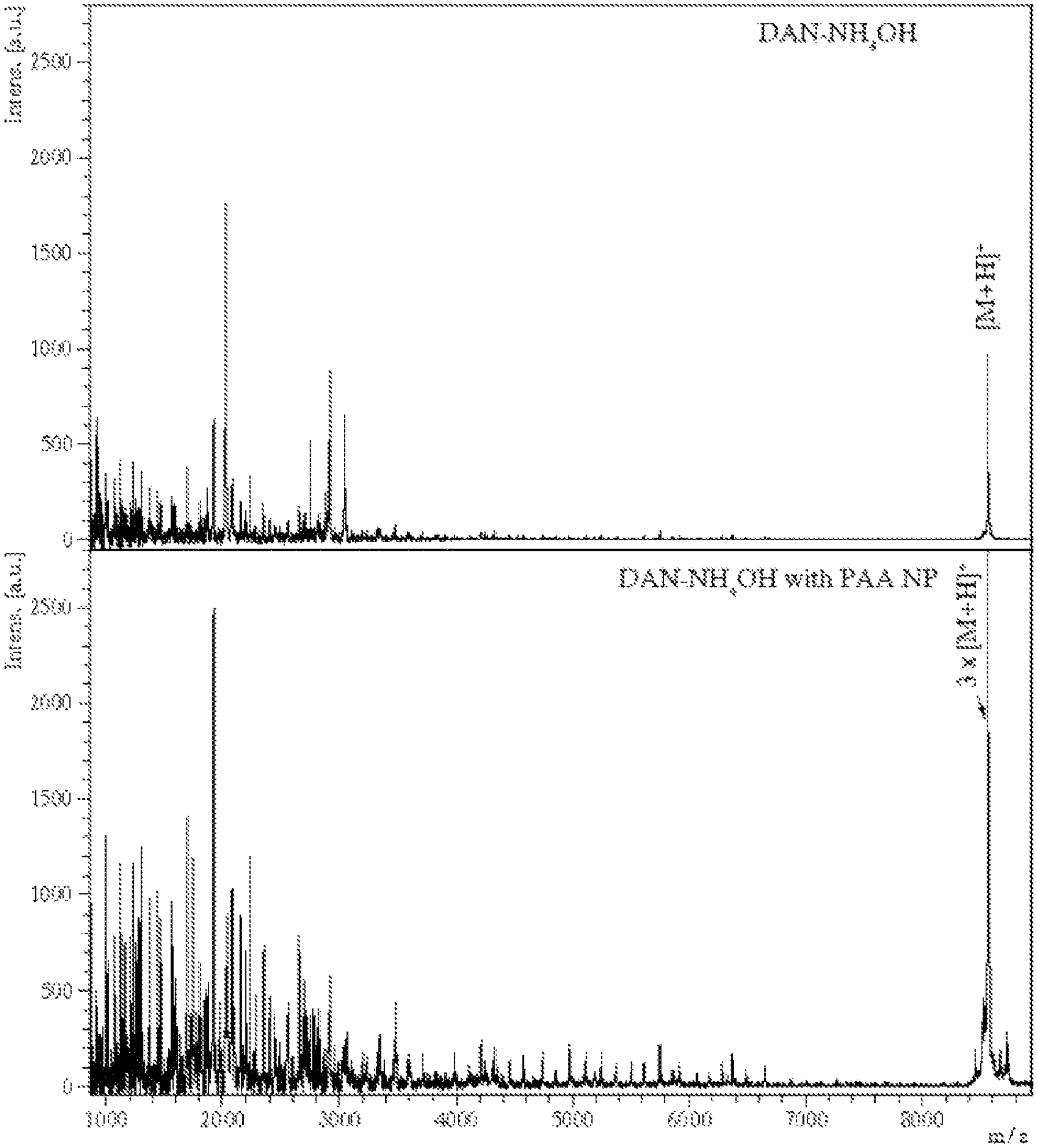
FIG. 6 is a MALDI/TOF ISD mass spectrum of the protein ubiquitin acquired using a 1,5-diaminonaphthalene (DAN) matrix with and without PAA-capped nanoparticles as a co-matrix.

PAA-capped nanoparticle matrices provided good quality mass spectra with protein and peptide samples. Adding a small amount of citric acid to the PAA capped nanoparticle matrix layer further improved the spectral quality. FIG. 5 shows the MALDI/TOF mass spectrum of cytochrome c acquired using a PAA-capped nanoparticle matrix with added citric acid. As shown in FIG. 5, cytochrome c is detected as singly and doubly charged ions. PAA-capped nanoparticle matrices were also evaluated as a co-matrix to 1,5-diaminonaphthalene (DAN) in enhancing protein ISD fragmentation (see FIG. 6).

Figure 7:
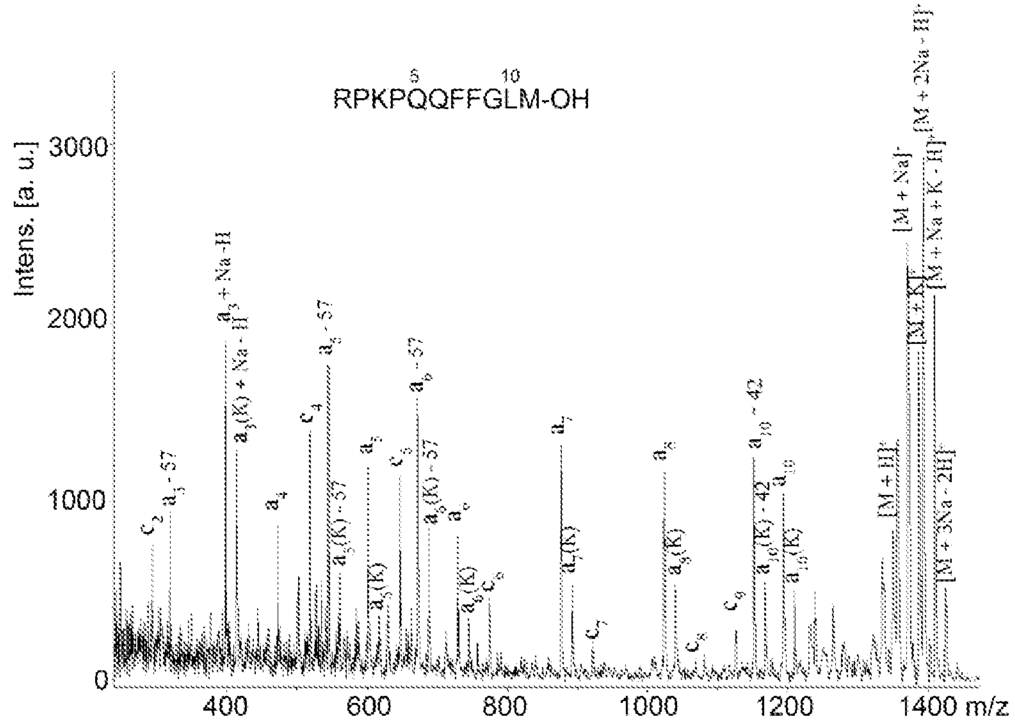
FIG. 7 is a MALDI/TOF ISD spectrum of the peptide [Met-OH]-substance P cations acquired using a thioglycerol-capped nanoparticle matrix. A 0.02 mg/mL thioglycerol-capped nanoparticle matrix was mixed with 0.1 mg/mL [Met-OH]-substance P in water at 1:1 ratio. One μL aliquot of the solution was then spotted onto an AnchorChip target and dried. If not specified, all product ions retain one $Na^+$ from the precursor ions. $K^+$ adducted a-ions are labelled as $a_n(K)$. Ions with an extra $Na^+$ are labelled as $a_3$+Na−H and $a_3(K)$+Na−H. Neutral losses from lysine, glutamine, and leucine side chains after a-cleavage (57 Da, 57 Da, and 36 Da, respectively) are also observed.

Thioglycerol capped nanoparticle matrix demonstrates enhanced fragmentation efficiency with peptide samples. FIG. 7 shows the MALDI in-source decay (ISD) mass spectrum of quasi-molecular cations from [Met-OH]-substance P. ISD products include a- and c-ions, which provide near complete sequence coverage. Neutral losses from side chains of lysine, glutamine, and leucine residues after a-cleavage (57 Da, 57 Da, and 36 Da, respectively) are also observed. In addition, the substance P ISD spectrum shows a clean background in low mass-to-charge (m/z) region, which allows identification of N-terminal residues through low m/z $c_2$ and [$a_3$-57]. In comparison, typical organic MALDI matrices for protein/peptide ISD (i.e., 2,5-dihydroxyl-benzoic acid and 1,5-diaminonaphthalene) have a high background of matrix ions in the <800 m/z spectra range, which makes identifying N-terminal residues difficult.

Example 3

Structural Characterization of Lipids Using Nanoparticle Matrices

Lipids analysis is typically conducted using liquid chromatography coupled to electrospray ionization mass spectrometry (LC-ESI-MS). There is an interest in detecting lipids using MALDI, particularly due to the development of MALDI imaging, as lipids in native tissues ionize particularly well and are abundant. Also, recent studies have shown that many lipids can serve as biomarkers for diagnostic purpose since many diseases cause alterations in lipid compositions in tissues or body fluids or both.

Lipids are more diversified than proteins and their polarities (negative, positive, or neutral) and abundance levels vary greatly within tissues. Different matrix choices favor different lipid classes. The matrix crystal size limits the MALDI imaging lateral resolution; matrix application density and homogeneity affect signal intensity; and the organic solvents normally mixed with traditional matrices would cause lipid extraction and delocalization. Therefore, matrix choice and sample preparation significantly impacts lipid MALDI imaging.

Nanoparticle matrices can improve MALDI imaging because of their clean background. In addition, the controlled particle size of nanoparticle matrices provides the opportunity to improve lateral resolution MALDI imaging, including MALDI imaging of lipids. In addition to yielding a clean mass spectral background and high resolution, nanoparticle matrices can be dispersed in water, which can minimize issues with lipid delocalization when employing traditional organic matrices.

Figure 8:
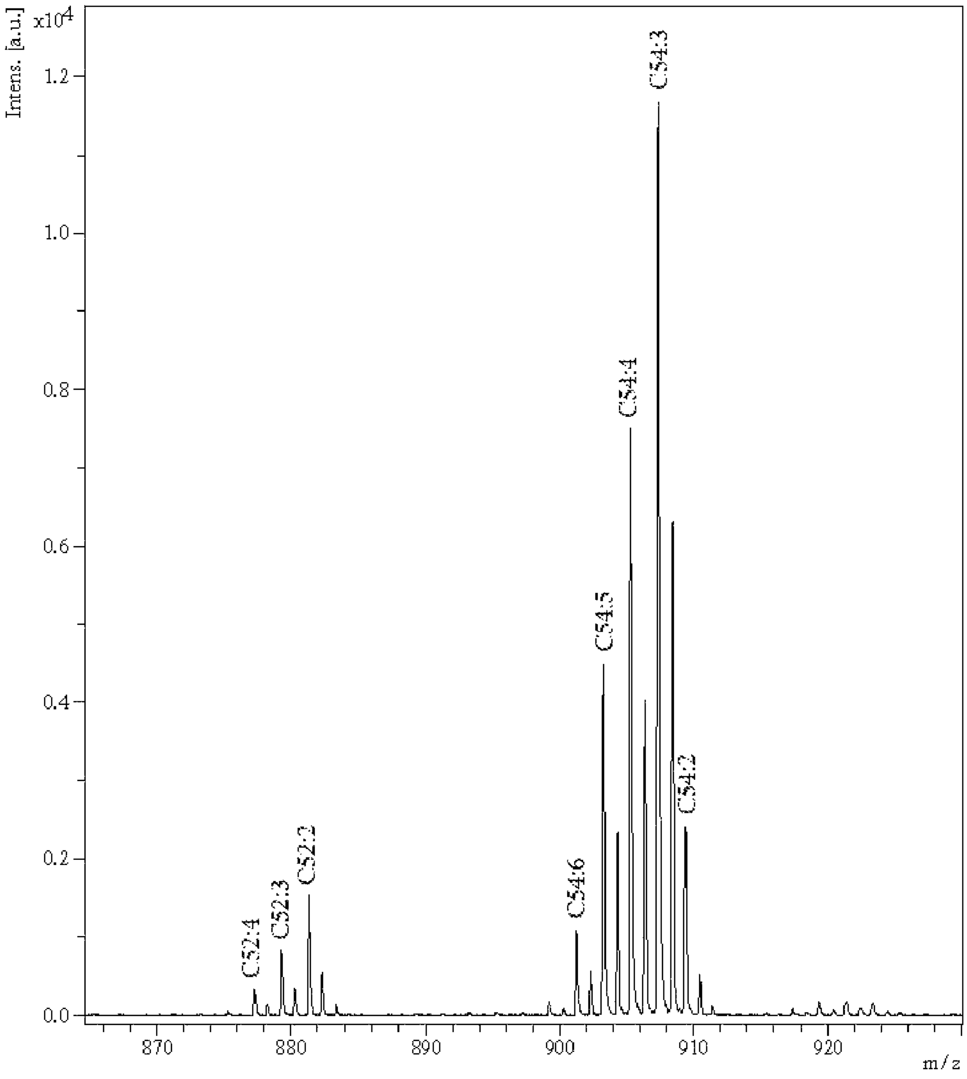
FIG. 8 is a MALDI-TOF mass spectrum of vegetable oil acquired using a PAA-capped nanoparticle matrix. The vegetable oil sample was diluted to 10 ppm in $CHCl_3$/MeOH (2/1, v/v). Sodiated triacylglycerol ions were observed. The labeling of the triacylglycerols follows standard practice (for example, in the case of C52:4, the 52 indicates the total number of acyl carbons, and the 4 indicates the total number of unsaturated bonds at fatty acid moieties).
Figure 9:
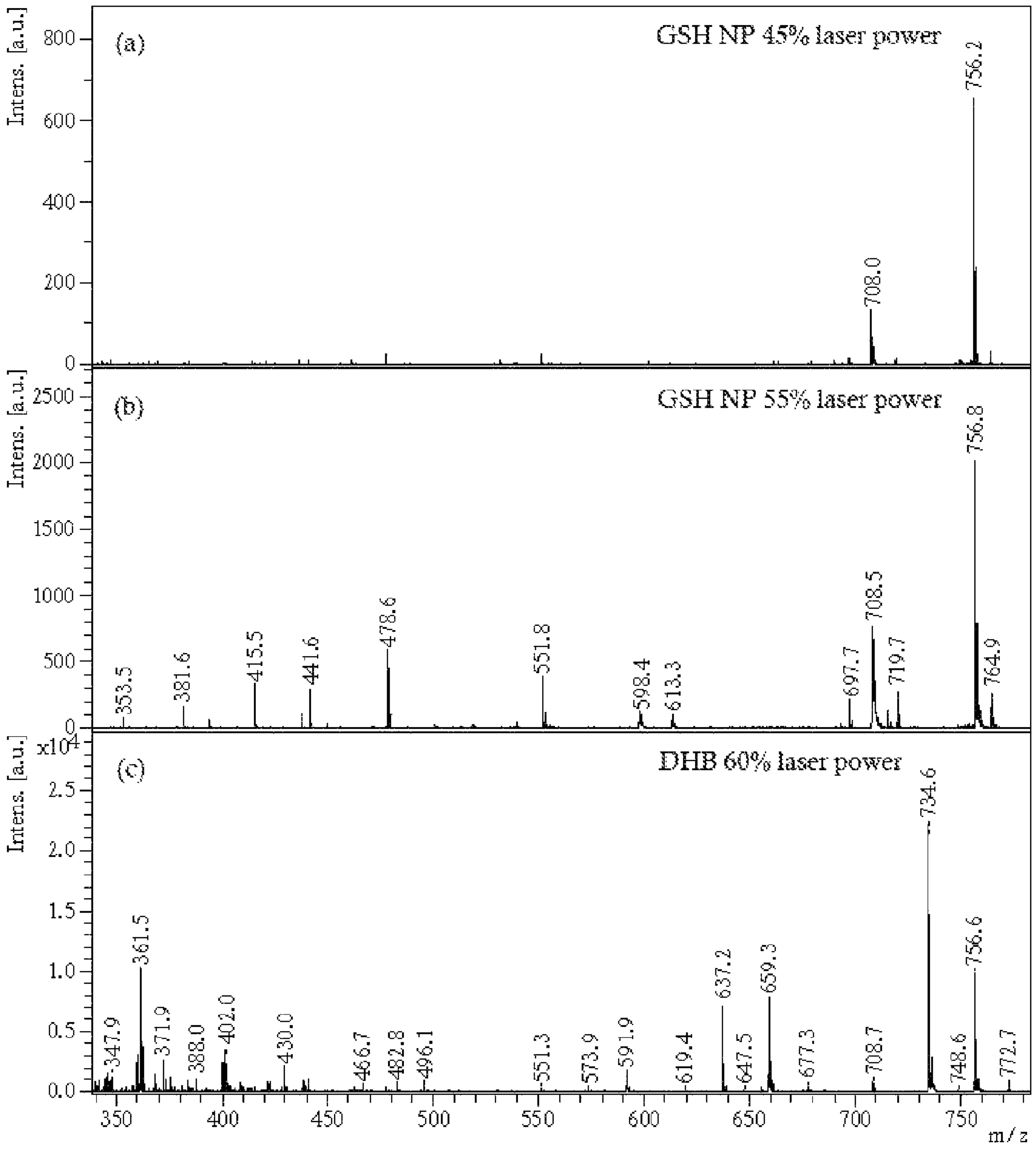
FIG. 9 are MALDI/TOF mass spectra of 1,2-dipalmitoyl-sn-glycero-3-phosphocholine (0.01 mg/mL, in $CH_3Cl$/MeOH, 2/1, v/v) acquired using a GSH-capped nanoparticle matrix and a DHB matrix. Panel (a) is the MALDI/TOF mass spectrum of 1,2-dipalmitoyl-sn-glycero-3-phosphocholine obtained using a GSH-capped nanoparticle matrix at 45% laser power. A peak corresponding to $[M+Na]^+$ (m/z 756.8) was observed. Panel (b) is the MALDI/TOF mass spectrum of 1,2-dipalmitoyl-sn-glycero-3-phosphocholine obtained using a GSH-capped nanoparticle matrix at 55% laser power. Abundant ISD fragmentations were observed at higher laser affluence, including fatty acid chain loss (m/z 478.6, $[M+H-C_{16}H_{32}O_2]^+$) and phosphocholin head group loss (m/z 551.1, $[M+H-HPO_4C_2H_4N(CH_3)_3]^+$). Panel (c) is the MALDI/TOF mass spectrum of 1,2-dipalmitoyl-sn-glycero-3-phosphocholine obtained using a DHB matrix at 60% laser power. The DHB matrix does not induce fatty acid side chain loss, both $[M+H]^+$ (m/z 734.6) and $[M+Na]^+$ were observed. The major fragmentations at m/z 637.2 and 659.3 are likely $[M+H-H_2PO_4]^+$ and $[M+Na-H_2PO_4]^+$ respectively.

Both nonanoparticleolar triacylglycerol and polar phosphocholine were detected using nanoparticle matrices. The MALDI experiment was performed on a Bruker ULTRAFLEX™ MALDI-TOF instrument equipped with a nitrogen laser (337 nm, 150 μJ per 3 ns). The mass spectra were taken in reflectron mode, with 200 scans. The laser power is around 45-60% attenuation. One μL of vegetable oil sample (10 ppm in $CHCl_3$/MeOH (2/1, v/v)) was applied to stainless steel target and dried, then one μL of PAA-capped nanoparticle matrix (0.1 mg/mL in water, 2 mM NaOH) was applied on top. One μL of 2-dipalmitoyl-sn-glycero-3-phosphocholine (0.01 mg/mL, in $CH_3Cl$/MeOH, 2/1, v/v) was applied to stainless steel target and dried, then 1 μL of GSH-capped nanoparticle matrix (0.1 mg/mL in water, 20 mM NaOH) or a DHB matrix (5 mg/mL, ACN/water 50/50, 0.1% TFA) was applied on top. The FIG. 8 shows the MALDI-TOF mass spectrum of vegetable oil acquired using a PAA-capped nanoparticle matrix. FIG. 9 shows the MALDI/TOF mass spectra of 1,2-dipalmitoyl-sn-glycero-3-phosphocholine acquired using a GSH-capped nanoparticle matrix (panels a and b) and DHB matrix (panel c).

One hindrance in lipid MALDI imaging using organic matrices is that polar lipids such as phosphocholines suppress signals from other less polar or neutral lipids. nanoparticle matrices can favor ionization of nonanoparticleolar compounds, reducing or eliminating the suppression effect from polar lipids. In addition, nanoparticles matrices allow controlled ISD fragmentation. At lower laser affluence (FIG. 9, panel a), $[M+Na]^+$ is observed, which facilitates lipids profiling. With increased laser power (FIG. 9, panel b), rich ISD fragmentation is observed. For example, in the case of 1,2-dipalmitoyl-sn-glycero-3-phosphocholine, fatty acid chain loss and phosphocholin head group loss are observed. The enhanced ISD fragmentation for lipids is a characteristic of the nanoparticle matrices; existing organic matrices, such as DHB, do not produce such information-rich fragments (see FIG. 9, panel c).

Example 4

Characterization of Small Molecules Using Nanoparticle Matrices

Drug distribution and metabolism determination is an important stage in drug discovery. MALDI imaging has attracted interest as a method for studying drug distribution and metabolism. This type of analysis is currently limited by matrix selection and sample preparation procedure, which have to be optimized to maximize detection efficiency of the target molecules from a complex tissue background. The interferences from matrix background ions in low mass region are particularly troublesome, because most drugs are small molecules.

The MALDI experiment was performed on a Bruker ULTRAFLEX™ MALDI-TOF mass spectrometer equipped with a nitrogen laser (337 nm, 150 μJ per 3 ns). The mass spectra were taken in reflectron mode, with 200 scans. The laser power is around 45-60% attenuation. 0.5 μL of the matrix solution was applied on top of a dried 1 μL sample layer. For oxaliplatin (25 μM in methanol) the matrices used are DHB matrix (5 mg/mL, ACN/water 50/50, 0.1% TFA) and Ldopa-capped nanoparticle matrix (0.1 mg/mL in water, desalted, 0.1% trifluoroacetic acid). For paclitaxel (22 μM in methanol) the matrices used are DHB matrix (5 mg/mL, ACN/water 50/50, 0.1% TFA) and a PAA-capped nanoparticle matrix (0.1 mg/mL in water, 20 mM NaOH).

Figure 10:
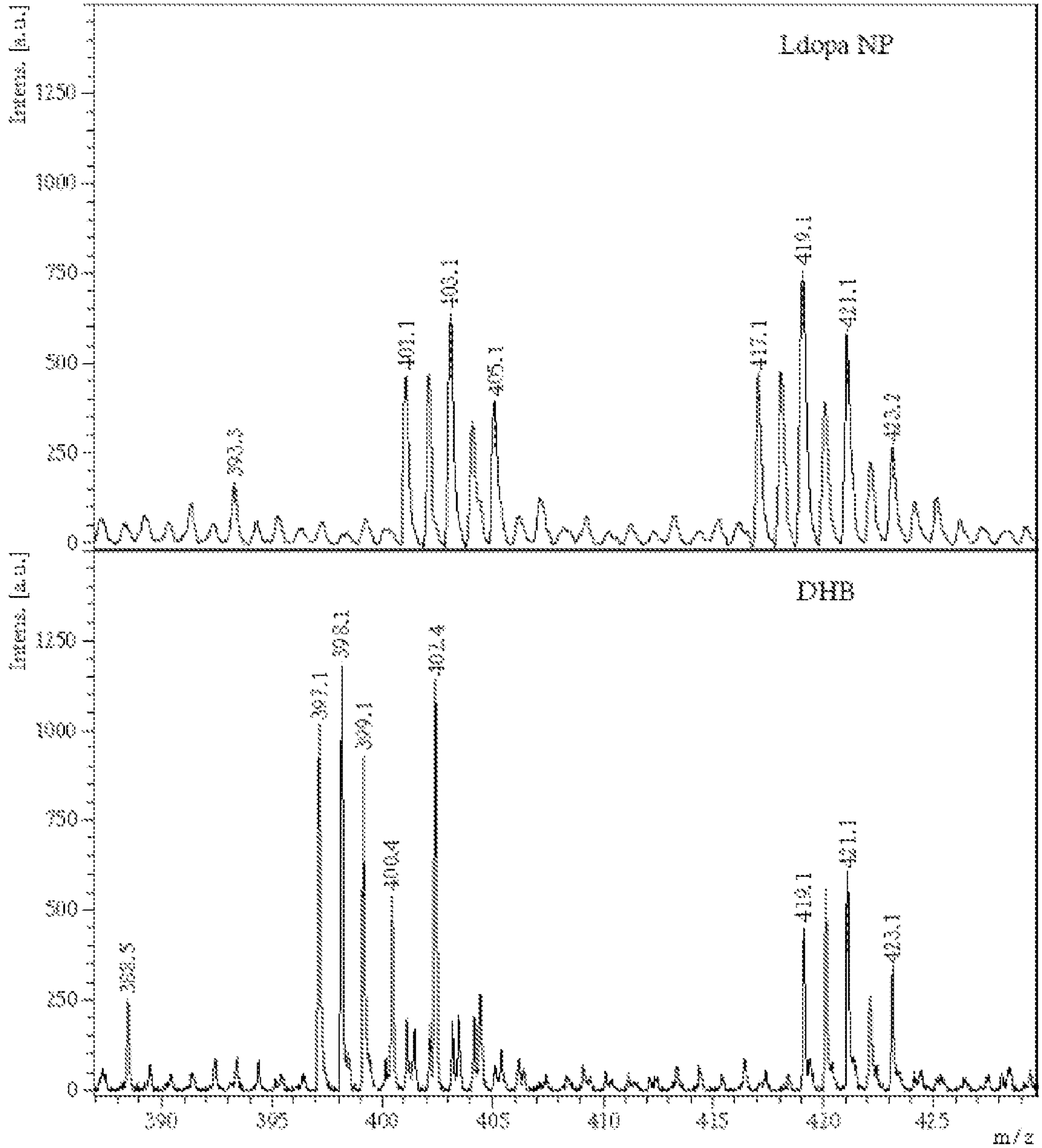
FIG. 10 contains MALDI/TOF mass spectra of oxaliplatin (25 μM in methanol) acquired using a DHB matrix (bottom spectra) and an Ldopa-capped nanoparticle matrix (top spectra, desalted, 0.1% trifluoroacetic acid). 0.5 μL of the matrix solution was applied on top of a dried 1 μL sample layer. With the DHB matrix, both $[M+H]^+$ (m/z 397, 398, 399, 401) and $[M+Na]^+$ (m/z 419, 420, 421, 423) were observed. With the L-dopa-capped nanoparticle matrix, [M+Na]' (m/z 419, 420, 421, 423), [M+Na−H] (m/z 418, 419, 420, 422), and [M+Na−2H] (m/z 417, 418, 419, 421) are observed. In addition, the ion series at m/z 401-405 are likely due to the loss of $NH_2$ from the sodiated parent ions.
Figure 11:
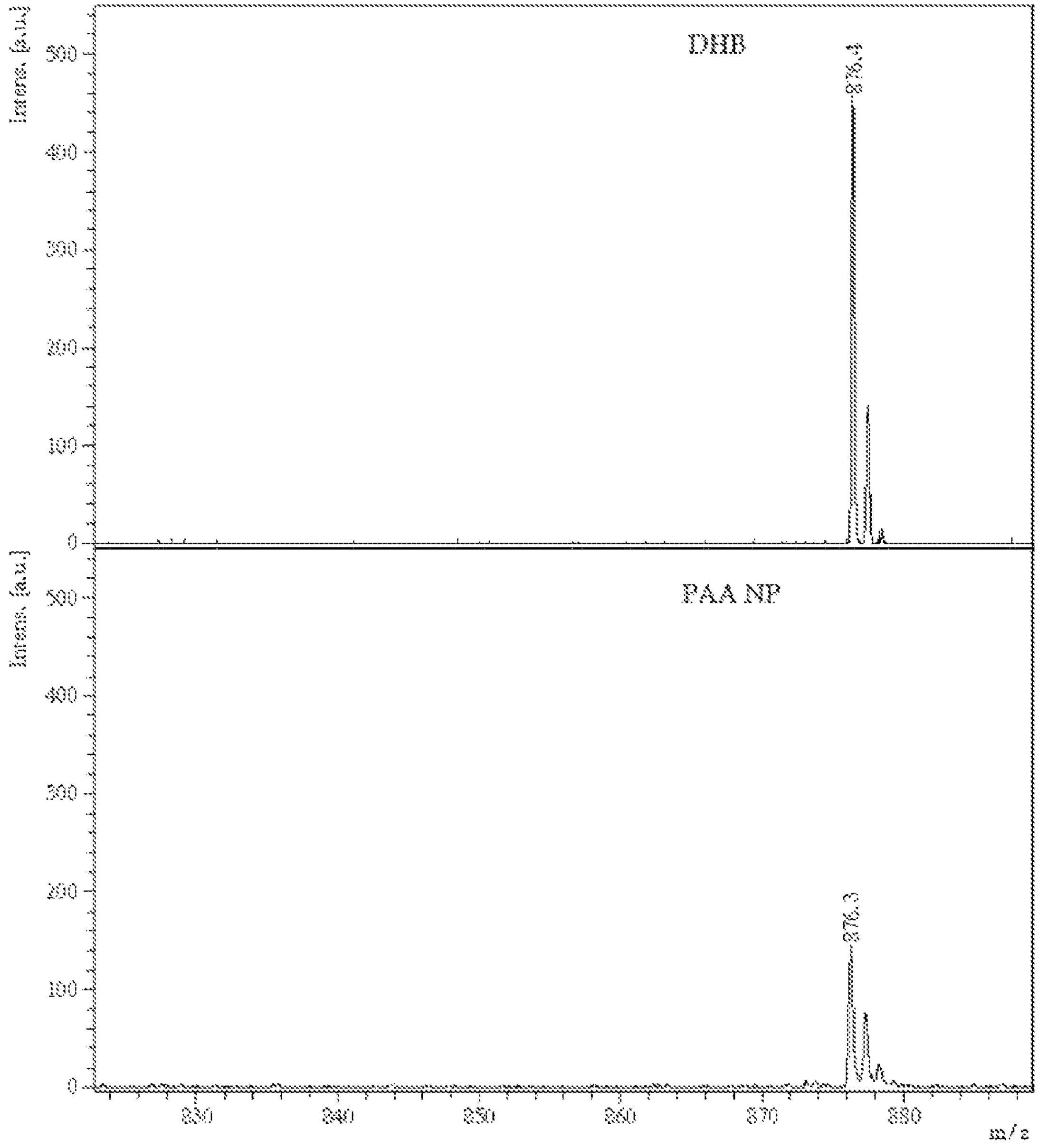
FIG. 11 is a MALDI/TOF mass spectrum of paclitaxel (22 μM in methanol) acquired using a DHB matrix (top spectra) and a PAA-capped nanoparticle matrix (bottom spectra. 0.5 μL of the matrix was applied on top of the dried 1 μL sample layer. For both matrices $[M+Na]^+$ (m/z 876.3) was observed.

As shown in FIGS. 10 and 11, two chemotherapy drug standards (oxaliplatin and paclitaxel) can be detected at concentrations of 20 μM using nanoparticle matrices. The signal intensity is comparable to that achieved with a DHB matrix. The clean spectral background quality makes nanoparticle matrices ideal candidates for imaging small molecules. In addition, nanoparticle matrices offer higher lateral resolution and less delocalization of target molecule, as discussed above in Example 3.

Example 5

Characterization of Polymers Using Nanoparticle Matrices

MALDI time of flight (MALDI/TOF) MS is widely used to analyze polymer absolute molecular weight and molecular weight distribution, and to characterize polymer structure and degradation products. Currently, the majority of the MALDI/TOF polymer analyses use a solvent-based sample preparation method, where the choice of matrix type, catonizing reagent, and solvent is selected to provide a suitable mass spectrum. For unknown polymers matrix selection is based on the polarity-similarity principle. The best result is generally obtained when matrix, polymers, and catonizing reagent are all soluble in the same solvent, which is a condition often difficult to fulfill. Solvent-free preparation method (grinding polymer and matrix together in solid state) has been developed to avoid such difficulties and extend MALDI/TOF applications to insoluble polymers. In solvent-free method the polymer/matrix/cationizing reagent molar ratio, sample grinding method, and grinding time length affect the spectra quality.

Nanoparticle matrices offer advantages which render them suitable for polymer analysis. The particle nature of nanoparticle matrices offers improved polymer/matrix miscibility, while the organic nature of the ligands coordinated to the nanoparticles provide flexibility in nanoparticle surface polarity and cationizing reagent modification.

The MALDI experiment was performed on a Bruker ULTRAFLEX™ MALDI-TOF instrument equipped with a nitrogen laser (337 nm, 150 μJ per 3 ns). The mass spectra were taken in reflectron mode, with 200 scans. The laser power is around 45-60% attenuation. 0.5 μL of a dopamine-capped nanoparticle matrix (1 mg/mL in water, 30 mM LiOH) was applied on top of the dried 1 μL KRYTOX™ 143AC PFPE (1% in perfluorohexane) sample layer. 0.5 μL of a dopamine-capped nanoparticle matrix (1 mg/mL in water, 20 mM NaOH) was applied on top of the dried 1 μL polyethylene glycol (PEG) 400 (1% in water) sample layer.

Figure 12:
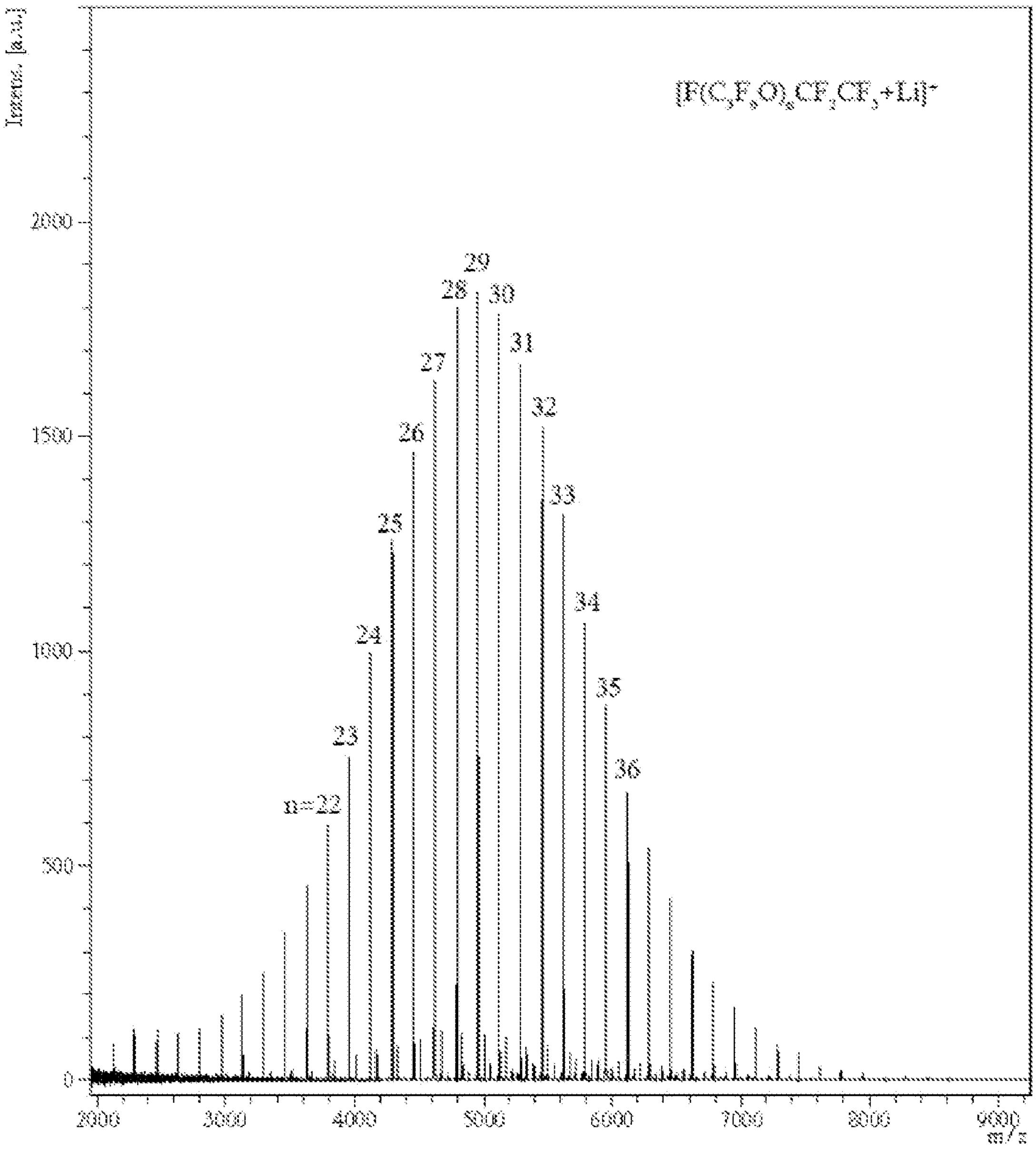
FIG. 12 is a MALDI/TOF mass spectrum of KRYTOX™ 143AC PFPE (1% in perfluorohexane) acquired using a dopamine-capped nanoparticle matrix in 30 mM LiOH water solution. 0.5 μL of the matrix was applied on top of the dried 1 μL sample layer. The observed ions are lithium-cationized PFPE ions.

FIG. 12 demonstrates the success using dopamine capped iron oxide nanoparticle matrix detecting perfluoropolyethers (PFPEs). The MALDI analysis with PFPEs has been difficult because their hydrophobicity discourages efficient mixing of PTFE with organic matrices. This problem can be overcome using a nanoparticle matrix. PTFE was applied onto a MALDI target in perfluorohexane solvent. Subsequently, dopamine-capped nanoparticles in a lithium hydroxide water solution were applied on top of the PTFE. The nanoparticles were evenly dispersed across the polymer layer. The spectral quality obtained using a nanoparticle matrix was superior compared to spectra obtained using fluorinated organic matrices.

Figure 13:
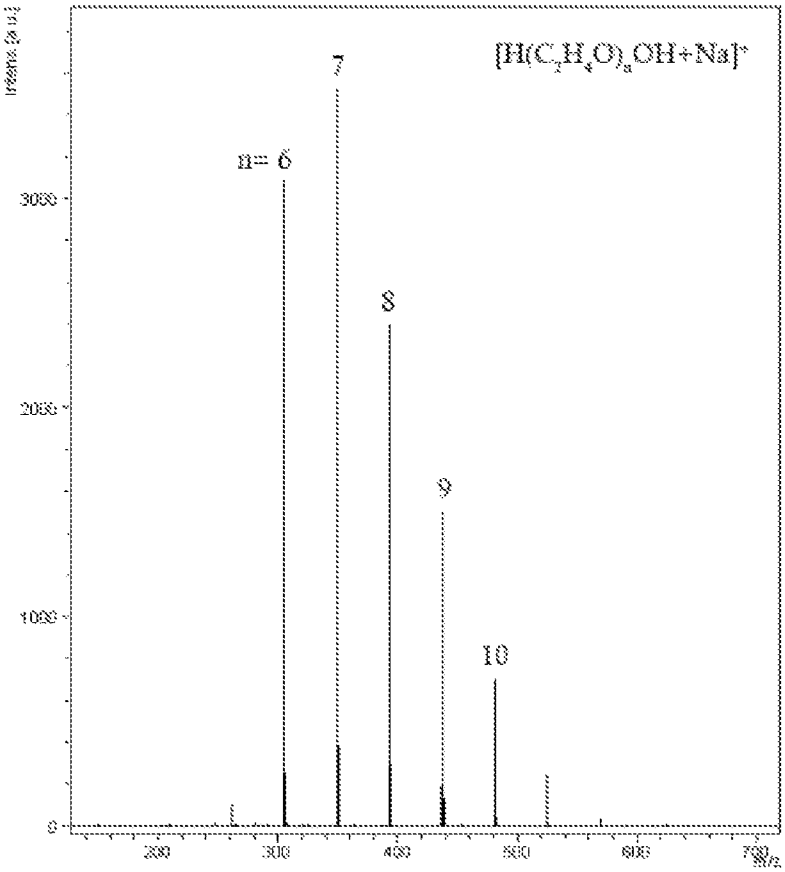
FIG. 13 is a MALDI/TOF spectrum of polyethylene glycol (PEG) 400 (1% in water) acquired using a dopamine-capped nanoparticle matrix. 0.5 μL of the matrix was applied on top of the dried 1 μL sample layer. The spectrum demonstrates intense PEG signals and a clean background in the low mass region.

Nanoparticle matrices can also be used to analyze water-miscible polymers. FIG. 13 shows the MALDI/TOF spectrum of PEG400 acquired using a dopamine-capped nanoparticle matrix. The spectrum demonstrates intense PEG signals and clean background in the low mass region. The intense signal and clean background in low mass region demonstrates the advantages of using nanoparticle matrices for the analysis of low molecular weight polymers, such as polyethylene glycols (PEGs).

Example 6

Characterization of Organometallic Compounds Using Nanoparticle Matrices

Organometallic compounds contain an organic part incorporated with one or more metal elements, or elements with metallic character, such as boron, silicon, and tellurium. These compounds have wide applications in catalysis, and some are antitumor drug candidates. Mass spectrometry serves as an important tool for organometallic compound structure characterization. Although traditional mass spectrometry approaches such as fast atom bombardment (FAB) have worked effectively, newer ionization techniques such as ESI and MALDI prove to be more sensitive. Both ESI and FAB work well with basic and polar compounds, but less effective for neutral or insoluble organometallic compounds, for which MALDI is a better choice. In addition, ESI spectra can be complicated and difficult to interpret due to adduct formation with solvent molecules or contaminants.

Currently, the majority of the organometallic MS studies have been performed with ESI rather than MALDI. One major factor limiting MALDI application is the matrix choice. Most currently available polar organic matrices are carboxylic acids and can be destructive to compounds sensitive to acidity. Aprotic matrices, such as 2-[(2E)-3-(4-tert-butylphenyl)-2-methylprop-2-enylidene]malononitrile (DCTB) ionize analytes through charge transfer mechanisms, but the spectra are still complicated by analyte polymerization and matrix adduct formation. Iron oxide nanoparticle matrices provide an alternative for sensitive and soft ionization of organometallic compounds without complicating factors such as matrix adduct ions or analyte polymerization.

Figure 14:
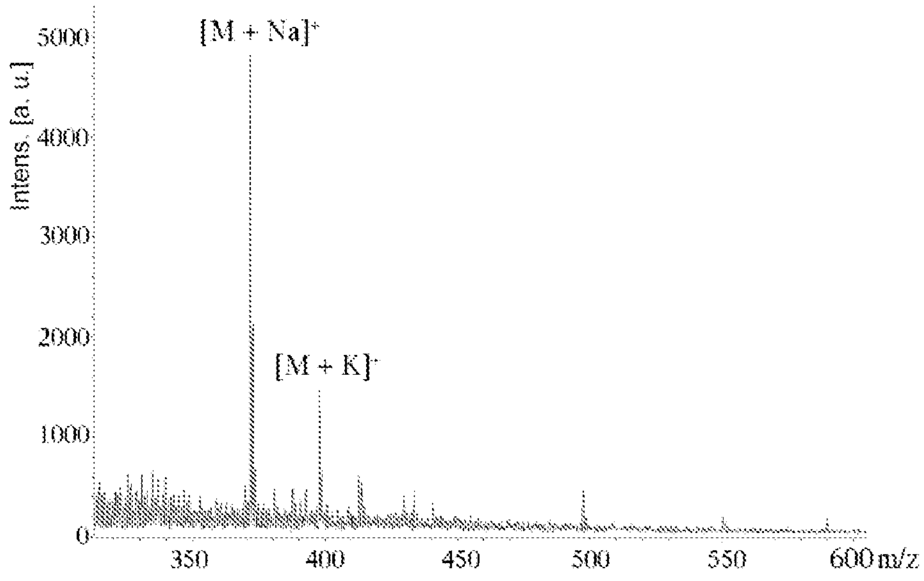
FIG. 14 is a MALDI/TOF spectrum of chromium acetylacetonate acquired using a thioglycerol-capped nanoparticle matrix. 0.005 mg/mL chromium acetylacetonate in methanol was mixed with 1 mg/mL thioglycerol-capped nanoparticle matrix in methanol at 1:1 ratio and 1 μL was applied onto target. $[M+Na]^+$ and $[M+K]^+$ ions are observed.

A thioglycerol-capped iron oxide nanoparticle matrix was shown to function as a sensitive MALDI matrix for organometallic compound chromium acetylacetonate, $Cr(acac)_3$ at 0.005 mg/mL (FIG. 14). The thioglycerol-coated iron oxide nanoparticles were synthesized by mixing 5 mL of ferrous ammonium citrate water solution (0.004 mg/mL) with 12 μL of monothioglycerol for 15 minutes, followed by slow addition of 3 mL of hydrazine, a reducing agent. The reaction mixture was then heated to 110° C. for 2 hours. The resulting nanoparticles were precipitated out solution and then redispersed in methanol for MALDI analysis. The MALDI experiment was performed on a Bruker ULTRAFLEX™ MALDI-TOF instrument equipped with a nitrogen laser (337 nm, 150 μJ per 3 ns). The mass spectra were taken in reflectron mode, with 200 scans. The laser power is around 20% attenuation.

The $Cr(acac)_3$ sample (0.005 mg/mL, in methanol) was mixed with thioglycerol-capped nanoparticle matrix (1 mg/mL, in methanol) at 1:1 volume ratio. One μL solution was then applied on stainless steel target. The dried sample spot was on-target washed with $CHCl_3$/MeOH (v/v, 2/1). Although $Cr(acac)_3$ has an efficient UV absorption that allows ion formation under direct laser desorption ionization (LDI) without the addition of matrices, nanoparticle matrices improve detection limit and reduce adduct formation. In FIG. 13, $[M+Na]^+$ and $[M+K]^+$ are the dominate quasi-molecular ions and no adduct ions are observed, indicating there is no matrix interference with the analyte. The LDI spectrum of $Cr(acac)_3$ at 0.005 mg/mL is poor compared to the MALDI spectrum with thioglycerol-capped nanoparticle matrix and is not provided.

The nanoparticles described herein can offer significant benefits as matrices for MALDI mass spectrometry. The nanoparticles can intensely absorb UV/visible light, providing for energy transfer from laser photons to the analyte of interest. In addition, the characteristics of the nanoparticles (e.g., chemical makeup of the metal oxide core, identity of the ligands coordinated to the metal oxide core, and combinations thereof) can be varied to provide a matrix suitable for a given analyte and/or analytical methods.

The nanoparticles can offer many advantages compared to traditional small molecule organic matrices for MALDI. First, nanoparticle matrices provide a cleaner mass spectral background as compared to small molecule organic matrices. The shell of ligands coordinated to the nanoparticles reduces matrix molecule self-clustering and fragmentation (a common problem with organic matrices), which in turn minimizes the intensity of low mass background ions that can complicate the mass spectra.

The shell of ligands coordinated to the nanoparticles can also be readily varied based on the analyte of interest. For example, the polarity of the nanoparticles can be tuned to render the matrix particles compatible with the analyte of interest (e.g., compatible with a hydrophobic or hydrophilic polymer). The ligands coordinated to the nanoparticles can also be varied to select the desired analyte of interest within a complex mixture. For example, nanoparticles-capped with dopamine ionizes glycans; however, the matrix is transparent to proteins in the test sample.

Nanoparticle matrices also allow for facile energy transfer to the analyte of interest. Due to their ability to absorb and transfer energy from the laser, nanoparticle matrices can induce abundant fragmentation of analyte ions by in-source decay (ISD). ISD is a tandem mass spectrometry (MS/MS) technique in which fragmentation in the MALDI source provides information on molecular structures.

The design and properties of nanoparticle matrices lead to a wide range of applications including top-down sequencing of proteins, structural characterization of glycans and lipids, and mass analysis of polymers. The nanoparticle matrices can also be used for the MALDI imaging of proteins, lipids, and drug molecules from tissues. MALDI imaging is a technique with enormous potential as molecules are directly analyzed from the biological tissues with spatial distribution information retained. The nanoparticle matrices are ideal for MALDI imaging due to their high lateral resolution and clean spectral background.

The methods and systems of the appended claims are not limited in scope by the specific described herein, which are intended as illustrations of a few aspects of the claims. Any methods and systems that are functionally equivalent are intended to fall within the scope of the claims. Various modifications of the methods and systems in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents can be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various examples, the terms "consisting essentially of" and "consisting of" can be used in place of "comprising" and "including" to provide for more specific examples of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A method of detecting an analyte, comprising:

contacting the analyte with a population of nanoparticles to form a target composition, wherein the nanoparticles comprise a metal oxide core and a plurality of ligands coordinated to the metal oxide core and wherein the metal oxide core comprises $Fe^{2+}$, $Fe^{3+}$, a ferric oxide, ferrous oxide, a non-ferrous metal ferrite, or combinations thereof;

directing energy onto the target composition to form an analyte ion; and detecting the analyte ion with a mass spectrometer.

2. The method of claim 1, wherein the population of nanoparticles further comprises an additive.

3. The method of claim 1, wherein the analyte is selected from the group consisting of a lipid, a glycolipid, a phospholipid, a glycerolipid, a fatty acid, a glycan, a protein, a glycoprotein, a lipoprotein, a peptidoglycan, a proteoglycan, a peptide, a polynucleotide, an oligonucleotide, a polymer, an oligomer, a small molecule, lignin, petroleum, a petroleum product, an organometallic compound, or combinations thereof.

4. The method of claim 1, wherein the non-ferrous metal ferrite comprises a zinc ferrite, a calcium ferrite, a magnesium ferrite, a manganese ferrite, a copper ferrite, a chromium ferrite, a cobalt ferrite, a nickel ferrite, a sodium ferrite, a potassium ferrite, barium ferrite, or combinations thereof.

5. The method of claim 1, wherein the ligands are hydrophobic.

6. The method of claim 1, wherein the ligands are hydrophilic.

7. The method of claim 1, wherein the ligands comprise an alcohol, a carboxylic acid, a phosphine, a phosphine oxide, an amine, a thiol, a siloxane, or combinations thereof.

8. The method of claim 1, wherein the ligands comprise a fatty acid selected from the group consisting of a long-chain saturated fatty acid, a long-chain monounsaturated fatty acid, a long-chain polyunsaturated fatty acid, or combination thereof.

9. The method of claim 8, wherein the fatty acid comprises myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, docosahexaenoic acid, caprylic acid, capric acid, lauric acid, myristic acid, palmitic acid, stearic acid, arachidic acid, behenic acid, lignoceric acid, cerotic acid, eicosenoic acid, mead acid, nervonic acid, or combinations thereof.

10. The method of claim 1, wherein the ligands are selected from the group consisting of trioctylphosphine oxide (TOPO), trioctylphosphine (TOP), triphenylphosphine (TPP), triphenylphosphine oxide (TPPO), trioctylamine (TOA), oleylamine, lauryldimethylamine oxide, dopamine, L-3,4-dihydroxyphenylalanine (L-DOPA), norepinephrine, 4-(2-amino-1-methylethyl)-1,2-benzenediol, 4-(1-Amino-2-propanyl)-1,2-benzenediol, glutathione (GSH), histamine (His), polyacrylic acid (PAA), polyethyleneimine (PEI), citric acid, gluconic acid, or combinations thereof.

11. The method of claim 1, wherein the smallest dimension of the nanoparticles ranges from about 1 nm to about 150 nm.

12. The method of claim 1, wherein the nanoparticles comprise ultrathin nanostructures having a smallest dimension ranging from about 1 nm to about 4 nm.

13. The method of claim 1, wherein the nanoparticles comprise nanocubes, nanobars, nanoplates, nanoflowers, nanowhiskers, nanotubes, nanospheres, or combinations thereof.

14. The method of claim 1, wherein the nanoparticles are prepared by a process that comprises incubating a precursor complex comprising a metallic moiety and one or more ligands coordinated to the metallic moiety at a temperature of from about 100° C. to about 300° C. for a period of time effective to form the population of nanoparticles by thermal displacement of one or more of the ligands from the metallic moiety.

15. The method of claim 1, wherein the nanoparticles are prepared by a process that comprises (a) incubating a precursor complex comprising a metallic moiety and one or more ligands coordinated to the metallic moiety at a temperature of from about 100° C. to about 300° C. for a period of time effective to form a population of nuclei by thermal displacement of one or more of the ligands from the metallic moiety; and (b) heating the nuclei to a temperature of from greater than 300° C. to about 400° C. to form the population of nanoparticles (c) reducing ammonium iron citrate with hydrazine, forming spherical iron oxide nanoparticles or doped oxide ferrites when other doping ions are present.

16. A method of ionizing an analyte, comprising:

contacting the analyte with a population of nanoparticles to form a target composition, wherein the nanoparticles comprise a metal oxide core and a plurality of ligands coordinated to the metal oxide core and wherein the metal oxide core comprises $Fe^{2+}$, $Fe^{3+}$, a ferric oxide, ferrous oxide, a non-ferrous metal ferrite, or combinations thereof;

pulsing a laser to direct energy onto the target composition to desorb and ionize the analyte, forming an analyte ion.

17. An ionization source for mass spectrometry, comprising:

a target composition comprising an analyte and a population of nanoparticles, wherein the nanoparticles comprise a metal oxide core and a plurality of ligands coordinated to the core and wherein the metal oxide core comprises $Fe^{2+}$, $Fe^{3+}$, a ferric oxide, ferrous oxide, a non-ferrous metal ferrite, or combinations thereof; and a laser positioned to direct energy onto the target composition to desorb and ionize the analyte to form an analyte ion.

18. The ionization source of claim 17, wherein the population of nanoparticles further comprises an additive.

19. The ionization source of claim 17, wherein the analyte is selected from the group consisting of a lipid, a glycolipid, a phospholipid, a glycerolipid, a fatty acid, a glycan, a protein, a glycoprotein, a lipoprotein, a peptidoglycan, a proteoglycan, a peptide, a polynucleotide, an oligonucleotide, a polymer, an oligomer, a small molecule, lignin, petroleum, a petroleum product, an organometallic compound, or combinations thereof.

20. The ionization source of claim 17, wherein the non-ferrous metal ferrite comprises a zinc ferrite, a calcium ferrite, a magnesium ferrite, a manganese ferrite, a copper ferrite, a chromium ferrite, a cobalt ferrite, a nickel ferrite, a sodium ferrite, a potassium ferrite, barium ferrite, or combinations thereof.

21. The ionization source of claim 17, wherein the ligands are hydrophobic.

22. The ionization source of claim 17, wherein the ligands are hydrophilic.

23. The ionization source of claim 17, wherein the ligands comprise an alcohol, a carboxylic acid, a phosphine, a phosphine oxide, an amine, a thiol, a siloxane, or combinations thereof.

24. The ionization source of claim 17, wherein the ligands comprise a fatty acid selected from the group consisting of a long-chain saturated fatty acid, a long-chain monounsaturated fatty acid, a long-chain polyunsaturated fatty acid, or combination thereof.

25. The ionization source of claim 24, wherein the fatty acid comprises myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, docosahexaenoic acid, caprylic acid, capric acid, lauric acid, myristic acid, palmitic acid, stearic acid, arachidic acid, behenic acid, lignoceric acid, cerotic acid, eicosenoic acid, mead acid, nervonic acid, or combinations thereof.

26. The ionization source of claim 17, wherein the ligands are selected from the group consisting of trioctylphosphine oxide (TOPO), trioctylphosphine (TOP), triphenylphosphine (TPP), triphenylphosphine oxide (TPPO), trioctylamine (TOA), oleylamine, lauryldimethylamine oxide, dopamine, L-3,4-dihydroxyphenylalanine (L-DOPA), norepinephrine, 4-(2-amino-1-methylethyl)-1,2-benzenediol, 4-(1-Amino-2-propanyl)-1,2-benzenediol, glutathione (GSH), histamine (His), polyacrylic acid (PAA), polyethyleneimine (PEI), citric acid, gluconic acid, or combinations thereof.

27. The ionization source of claim 17, wherein the smallest dimension of the nanoparticles ranges from about 1 nm to about 150 nm.

28. The ionization source of claim 17, wherein the nanoparticles comprise ultrathin nanostructures having a smallest dimension ranging from about 1 nm to about 4 nm.

29. The ionization source of claim 17, wherein the nanoparticles comprise nanocubes, nanobars, nanoplates, nanoflowers, nanowhiskers, nanotubes, nanospheres, or combinations thereof.

* * * * *